US012680508B2

(12) United States Patent
Spitzer et al.

(10) Patent No.: US 12,680,508 B2
(45) Date of Patent: Jul. 14, 2026

(54) HYBRID TURBOFAN ENGINE WITH A PLANETARY GEARSET FOR BLENDING POWER BETWEEN AN ELECTRIC OUTPUT AND VARIABLE-THRUST BYPASS FAN

(71) Applicant: VerdeGo Aero, Inc., Daytona Beach, FL (US)

(72) Inventors: David N. Spitzer, Port Orange, FL (US); Richard Pat Anderson, De Leon Springs, FL (US); Patrick Currier, Port Orange, FL (US); Austin Cassels, Daytona Beach, FL (US)

(73) Assignee: VerdeGo Aero, Inc., Daytona Beach, FL (US)

( * ) Notice: Subject to any disclaimer, the term of this patent is extended or adjusted under 35 U.S.C. 154(b) by 0 days.

(21) Appl. No.: 18/927,784

(22) Filed: Oct. 25, 2024

(65) Prior Publication Data

US 2025/0043733 A1     Feb. 6, 2025

Related U.S. Application Data

(63) Continuation of application No. PCT/NL2023/050229, filed on Apr. 28, 2023.

(Continued)

(51) Int. Cl.
*F02C 7/36* (2006.01)

(52) U.S. Cl.
CPC .......... *F02C 7/36* (2013.01); *F05D 2220/323* (2013.01); *F05D 2260/40311* (2013.01); *F05D 2270/053* (2013.01)

(58) Field of Classification Search
CPC ................. F02C 7/36; F05D 2220/323; F05D 2260/40311; F05D 2270/053
See application file for complete search history.

(56) References Cited

U.S. PATENT DOCUMENTS

| 5,045,027 A | 9/1991 | Larsen |
| 5,255,733 A | 10/1993 | King |
| (Continued) | | |

FOREIGN PATENT DOCUMENTS

| CN | 101075768 A | 11/2007 |
| CN | 107476837 A | 12/2017 |
| (Continued) | | |

OTHER PUBLICATIONS

C. Pornet, A. T.Isikveren, "Conceptual design of hybrid-electric transport aircraft," http://dx.doi.org/10.1016/j.paerosci.2015.09.0020376-0421/ © 2015 Elsevier Ltd. (Year: 2015).*

(Continued)

*Primary Examiner* — David P. Olynick
(74) *Attorney, Agent, or Firm* — Greenberg Traurig LLP

(57) ABSTRACT

An aircraft powerplant includes an engine having an output power shaft. The aircraft powerplant further includes a power transmission coupled to the output power shaft of the engine. The power transmission is configured to divide power output of the engine between a mechanical power output and an electrical power output. A majority of the power output from the engine is adjustable to output to either of the mechanical power output or the electrical power output. The aircraft powerplant further includes a propulsion mechanism coupled to the mechanical power output. The aircraft powerplant further includes a control system configured to cause the power transmission to deliver the majority of the power output of the engine to the propulsion mechanism to generate thrust or deliver the majority of the power output of the engine as electrical power output via the electrical power output.

20 Claims, 20 Drawing Sheets

Related U.S. Application Data

(60) Provisional application No. 63/335,579, filed on Apr. 27, 2022.

(56) References Cited

U.S. PATENT DOCUMENTS

| | | | |
|---|---|---|---|
| 5,939,800 | A | 8/1999 | Artinian |
| 6,340,289 | B1 | 1/2002 | Vos |
| 8,324,746 | B2 | 12/2012 | Bradbrook |
| 8,365,510 | B2 | 2/2013 | Lugg |
| 8,446,060 | B1 | 5/2013 | Lugg |
| 8,544,575 | B1 | 10/2013 | Scaringe |
| 8,636,241 | B2 | 1/2014 | Lugg |
| 8,814,081 | B2 | 8/2014 | Gagne |
| 9,102,326 | B2 | 8/2015 | Anderson |
| 9,174,741 | B2 | 11/2015 | Suntharalingam |
| 9,193,451 | B2 | 11/2015 | Salyer |
| 9,493,245 | B2 | 11/2016 | Salyer |
| 9,638,199 | B2 | 5/2017 | Beers |
| 9,828,110 | B2 | 11/2017 | Roques |
| 9,878,796 | B2 | 1/2018 | Sheridan |
| 10,173,784 | B2 | 1/2019 | Stewart |
| 10,384,774 | B2 | 8/2019 | Vondrell |
| 10,392,120 | B2 | 8/2019 | Niergarth |
| 10,435,169 | B2 | 10/2019 | Steinwandel |
| 10,633,104 | B2 | 4/2020 | Miller |
| 10,822,101 | B2 | 11/2020 | Murrow |
| 11,053,019 | B2 | 7/2021 | Mackin |
| 12,095,125 | B2 | 9/2024 | Holland |
| 2004/0104578 | A1 | 6/2004 | Wurtele |
| 2007/0089411 | A1 | 4/2007 | Leistner |
| 2008/0184906 | A1 | 8/2008 | Kejha |
| 2009/0023494 | A1 | 1/2009 | Colletti |
| 2009/0133666 | A1 | 5/2009 | Thomas |
| 2009/0293494 | A1 | 12/2009 | Hoffjann |
| 2010/0000226 | A1 | 1/2010 | Rensch |
| 2010/0219779 | A1 | 9/2010 | Bradbrook |
| 2012/0122631 | A1 | 5/2012 | Galivel |
| 2012/0227389 | A1 | 9/2012 | Hinderks |
| 2013/0022443 | A1 | 1/2013 | Beers |
| 2013/0028751 | A1 | 1/2013 | Rai |
| 2013/0099065 | A1* | 4/2013 | Stuhlberger ......... B64D 27/355 |
| | | | 903/902 |
| 2013/0113219 | A1 | 5/2013 | Honkanen |
| 2014/0010652 | A1 | 1/2014 | Suntharalingam |
| 2016/0031564 | A1 | 2/2016 | Yates |
| 2016/0176533 | A1 | 6/2016 | Cazals |
| 2016/0245163 | A1 | 8/2016 | Lamarre |
| 2017/0203839 | A1 | 7/2017 | Giannini |
| 2017/0226934 | A1 | 8/2017 | Robic |
| 2017/0297679 | A1 | 10/2017 | Elliott |
| 2017/0297743 | A1 | 10/2017 | Tindall |
| 2018/0003072 | A1 | 1/2018 | Lents |
| 2018/0050807 | A1 | 2/2018 | Kupiszewski |
| 2018/0051702 | A1 | 2/2018 | Kupiszewski |
| 2018/0051716 | A1 | 2/2018 | Cheung |
| 2018/0163558 | A1* | 6/2018 | Vondrell ............... B64D 27/10 |
| 2018/0257776 | A1 | 9/2018 | Phan |
| 2018/0291807 | A1 | 10/2018 | Dalal |
| 2019/0034898 | A1 | 1/2019 | Berkowitz |
| 2019/0085714 | A1* | 3/2019 | Zatorski ................. H02K 7/116 |
| 2019/0085715 | A1* | 3/2019 | van der Merwe ...... F02C 3/067 |
| 2019/0135408 | A1 | 5/2019 | Moore |
| 2019/0264617 | A1 | 8/2019 | Barmichev |
| 2019/0276142 | A1 | 9/2019 | Przybyla |
| 2019/0322382 | A1 | 10/2019 | Mackin |
| 2019/0323427 | A1 | 10/2019 | Mackin |
| 2019/0344898 | A1 | 11/2019 | Scothern |
| 2020/0010208 | A1 | 1/2020 | Peace |
| 2020/0017229 | A1 | 1/2020 | Steinert |
| 2020/0130534 | A1 | 4/2020 | Julien |
| 2020/0140079 | A1 | 5/2020 | Campbell |
| 2020/0148373 | A1* | 5/2020 | Long ...................... F01D 15/10 |
| 2020/0149427 | A1* | 5/2020 | Long ...................... B64D 27/02 |
| 2020/0164992 | A1 | 5/2020 | Tamada |
| 2020/0290742 | A1 | 9/2020 | Kumar |
| 2020/0298988 | A1* | 9/2020 | LaTulipe ............... F02B 39/10 |
| 2020/0340406 | A1 | 10/2020 | Maljean |
| 2020/0385139 | A1 | 12/2020 | Verna |
| 2021/0078700 | A1 | 3/2021 | Klemen |
| 2021/0310412 | A1 | 10/2021 | Williams |
| 2021/0387723 | A1 | 12/2021 | Moon |
| 2022/0042465 | A1* | 2/2022 | Swann ...................... F02C 6/20 |
| 2022/0093948 | A1 | 3/2022 | Holland |

FOREIGN PATENT DOCUMENTS

| | | |
|---|---|---|
| CN | 107701318 A | 6/2020 |
| EP | 3199791 A1 | 8/2017 |
| EP | 2226487 B1 | 12/2018 |
| GB | 2587669 A | 4/2021 |
| JP | 2008075647 A | 4/2008 |
| JP | 2020511350 A | 4/2020 |
| KR | 101797011 B1 | 11/2017 |
| WO | 2018041876 A1 | 3/2018 |
| WO | 2020079369 A1 | 4/2020 |
| WO | 2020240134 A1 | 12/2020 |
| WO | 2021058329 A1 | 4/2021 |

OTHER PUBLICATIONS

Patrick C. Vratny, Holger Kuhn, Mirko Hornung "Influences of voltage variations on electric power architectures for hybrid electric aircraft," CEAS Aeronaut J (2017) 8:31-43, Published online: Oct. 11, 2016. (Year: 2016).*

Robert Cameron Bolam, Yuriy Vagapov, Alecksey Anuchin, "Review of Electrically Powered Propulsion for Aircraft," Sep. 2018, 978-1-5386-2910-9/18 © 2018 (Year: 2018).*

Vincenzo Madonna, Paolo Giangrande, and Michael Galea, "Electrical Power Generation in Aircraft: Review, Challenges, and Opportunities," Digital Object Identifier 10.1109/TTE.2018.2834142, 2332-7782 © 2018 IEE (Year: 2018).*

Non-final Office Action from U.S. Appl. No. 18/236,363, dated Dec. 4, 2024, 10 pp.

International Preliminary Report on Patentability from application number PCT/NL2023/050229, dated Nov. 7, 2024, 10 pp.

"Classifications of Aircraft Engines" (Mutib) Mar. 2020 (03.2020) (online] retrieved from <URL: https://enj.atu.edu.iqlwp-contentluploads/2020/03/Classifications of-Aircraft-Englnes-Copy.pdf> entire document, 20 pp.

Enstrom 280-280C Maintenance Manual, Copyright 1977, Enstrom Helicopter Corporation, Menominee, MI 49858, 451 pgs. (Uploaded in two parts).

Enstrom F-28A Maintenance Manual, Copyright 1972, Enstrom Corporation, Menominee, MI U.S.A., 373 pgs. (Uploaded in three parts).

Final Office Action from U.S. Appl. No. 18/370,213, dated Aug. 20, 2024, 19 pp.

International Search Report and Written Opinion from international application No. PCT/US22/20602, mailed Jun. 15, 2022, 22 pp.

International Search Report and Written Opinion issued in appl. No. PCT/US22/17379, dated May 18, 2022, 14 pgs.

International Search Report and Written Opinion issued in appl. No. PCT/US22/17383, dated Sep. 23, 2022, 13 pgs.

International Search Report and Written Opinion issued in appl. No. PCT/US23/10956, dated Jun. 23, 2023, 14 pgs.

International Search Report and Written Opinion of international application No. PCT/NL2023/050229, mailed Sep. 15, 2023, 18 pp.

International Search Report and Written Opinion of international application No. PCT/US2023/010956, dated Jun. 23, 2023, 14 pp.

International Search Report and Written Opinion of international application No. PCT/US23/66329, dated Jan. 12, 2024, 15 pp.

Non-final Office Action from U.S. Appl. No. 18/236,349, dated Jul. 24, 2024, 17 pp.

Non-final Office Action from U.S. Appl. No. 18/370,213, dated Feb. 12, 2024, 21 pp.

Robinson Helicopter Company, R22 Maintenance Manual and Instructions for Continued Airworthiness, RTR 060 vol. 1, 706 pgs.

(56)                 References Cited

OTHER PUBLICATIONS

White, Warren N. et al., Active Control of Wind Turbine Rotor Torsional Vibration, Proceedings of the ASME 2013 Dynamic Systems and Control Conference, DSCC2013, Oct. 21-23, 2013, Palo Alto, CA, USA, 9 pgs.

Youtube video: TEDxDirigo—Richard Lugg—Hybrid Engines in Aerospace—YouTube available at https://www.youtube.com/watch?v=eEyvpYppF_ c, 2 pp.

Final Office Action in U.S. Appl. No. 18/771,463, dated Aug. 3, 2025, 25 pp.

Extended European Search Report from application No. 22757136.1, dated Jan. 15, 2025, 12 pp.

Extended European Search Report from application No. 22763777.4, dated Jan. 15, 2025, 11 pp.

Extended Search Report from European application No. 22772153.7, dated Jan. 29, 2025, 15 pp.

Final Office Action from U.S. Appl. No. 18/236,363, dated Jul. 29, 2025, 10 pp.

Non-final Office Action from U.S. Appl. No. 18/236,349, dated Jul. 17, 2025, 24 pp.

Final Office Action from U.S. Appl. No. 18/236,349, dated Feb. 9, 2026, 28 pp.

Office Action from Japanese application No. 2023-550177, mailed Mar. 3, 2026, 10 pp.

Extended Search Report from EP application No. 23740736.6, dated Nov. 24, 2025, 37 pp.

Office Action from European application No. 22757136.1, dated Feb. 4, 2026, 7 pp.

Non-final Office Action from U.S. Appl. No. 18/236,636, dated Mar. 10, 2026, 9 pp.

* cited by examiner

101

105

300

305

315

310

325

315

320

800

Gear

Dog Teeth

Cone

Cone

Splined Hub

800

Ring with
internal dog
teeth

Main Shaft

Synchro Hub

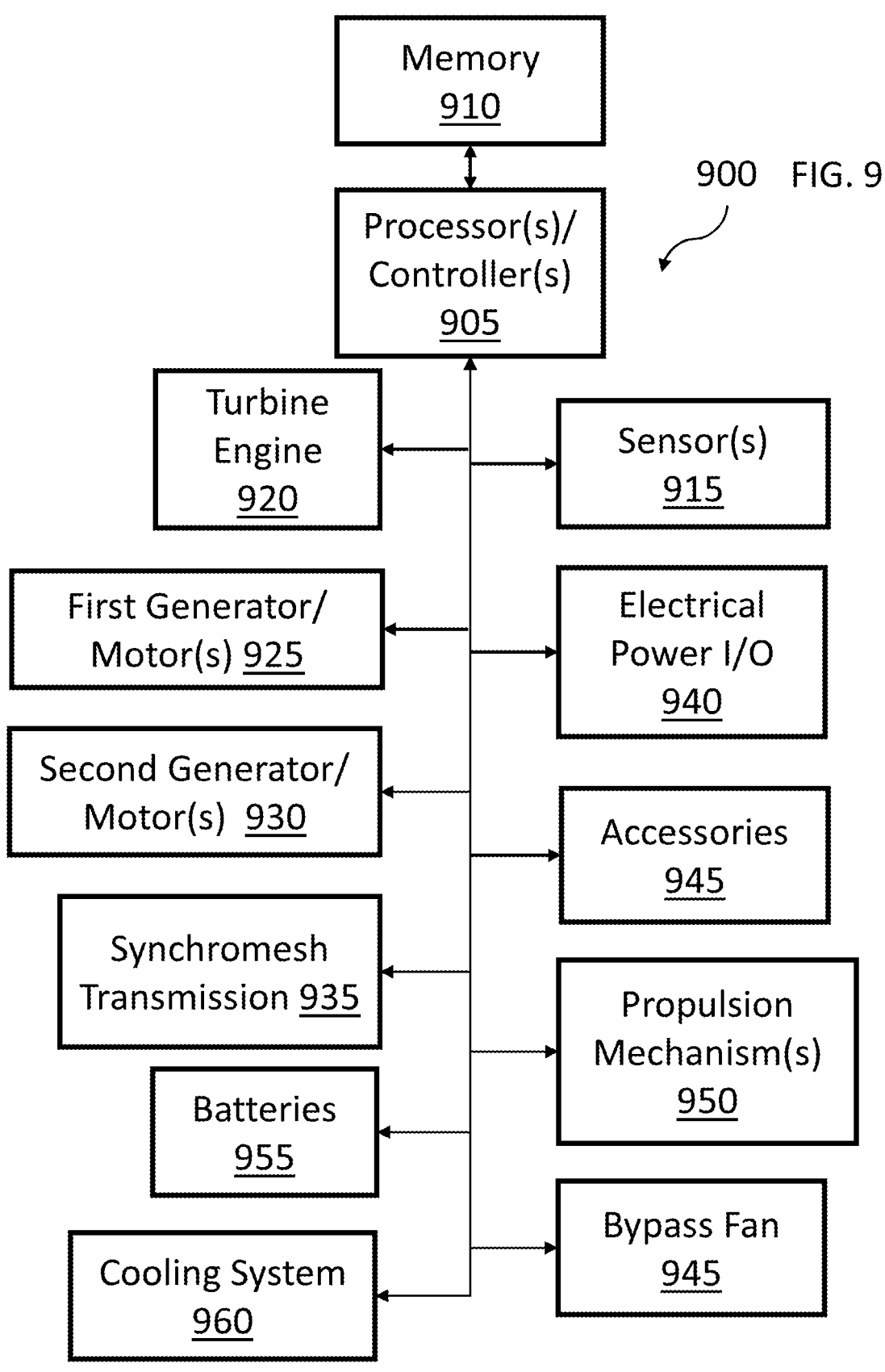
900    FIG. 9

Figure 10:
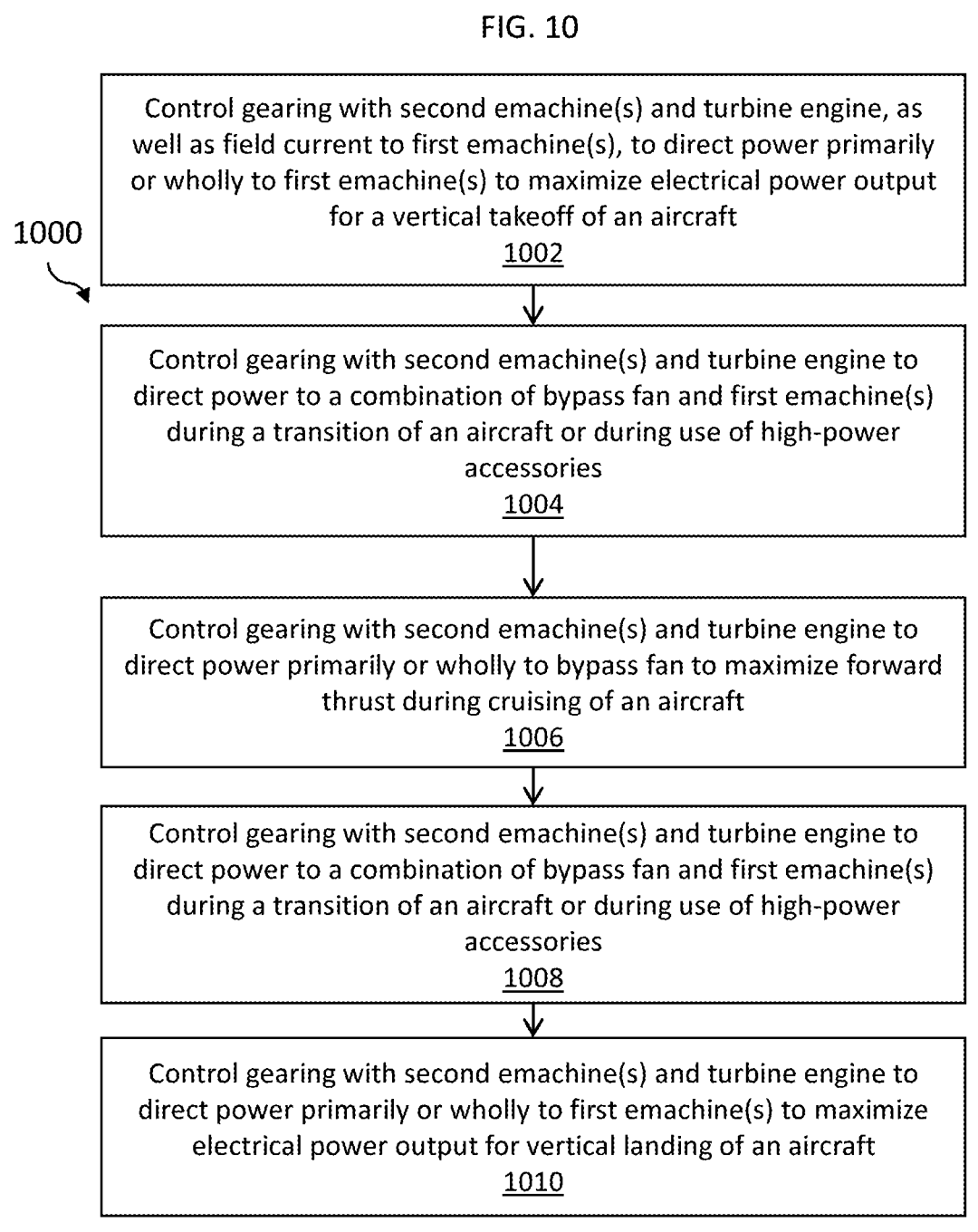

Control gearing with second emachine(s) and turbine engine, as well as field current to first emachine(s), to direct power primarily or wholly to first emachine(s) to maximize electrical power output for a vertical takeoff of an aircraft
1002

↓

Control gearing with second emachine(s) and turbine engine to direct power to a combination of bypass fan and first emachine(s) during a transition of an aircraft or during use of high-power accessories
1004

↓

Control gearing with second emachine(s) and turbine engine to direct power primarily or wholly to bypass fan to maximize forward thrust during cruising of an aircraft
1006

↓

Control gearing with second emachine(s) and turbine engine to direct power to a combination of bypass fan and first emachine(s) during a transition of an aircraft or during use of high-power accessories
1008

↓

Control gearing with second emachine(s) and turbine engine to direct power primarily or wholly to first emachine(s) to maximize electrical power output for vertical landing of an aircraft
1010

1300

Cooled by Ambient Air to Lower Temperature of High-Pressure Air Stream

1310

Heat Exchanger

Ambient Airstream

1315

Chilled Air Mass Available for Required System Cooling

Expanded Through Turbine to Drive Compressor and Reduce Temperature Dramatically

1305

Hot, High-Pressure Bleed Air from Turbine Compressor

Further Compressed to Raise Pressure and Temperature

HYBRID TURBOFAN ENGINE WITH A PLANETARY GEARSET FOR BLENDING POWER BETWEEN AN ELECTRIC OUTPUT AND VARIABLE-THRUST BYPASS FAN

CROSS-REFERENCE TO RELATED PATENT APPLICATIONS

This application is a continuation of PCT/NL2023/050229, filed Apr. 28, 2023, which claims the benefit of U.S. Provisional Patent Application No. 63/335,579, filed Apr. 27, 2022, the entire contents of each of which are hereby incorporated by reference in their entirety.

BACKGROUND

There are varying types of aircraft that are propelled using different types of propulsion mechanisms, such as propellers, turbine or jet engines, rockets, or ramjets. Different types of propulsion mechanisms may be powered in different ways. For example, some propulsion mechanisms like a propeller may be powered by an internal combustion engine or an electric motor. Other propulsion mechanisms like a turbofan or turboshaft may be powered by a turbine engine.

SUMMARY

In an embodiment, an aircraft powerplant includes an engine having an output power shaft. The aircraft powerplant further includes a power transmission coupled to the output power shaft of the engine. The power transmission is configured to divide power output of the engine between a mechanical power output and an electrical power output. A majority of the power output from the engine is adjustable to output to either of the mechanical power output or the electrical power output. The aircraft powerplant further includes a propulsion mechanism coupled to the mechanical power output. The aircraft powerplant further includes a control system configured to cause the power transmission to deliver the majority of the power output of the engine to the propulsion mechanism to generate thrust or deliver the majority of the power output of the engine as electrical power output via the electrical power output.

In an embodiment, a method for splitting power output from an engine of an aircraft between an electric power output and a mechanical power output includes controlling, in a first mode of operation, a power transmission of the aircraft to generate electrical power using substantially all power output from the engine. The method further includes controlling, in a second mode of operation, the power transmission to generate very little or no electricity from the mechanical power output from the engine, wherein the second mode further comprises controlling the power transmission such that most or all of the power output from the engine is directed to the mechanical power output.

In an embodiment, an aircraft powerplant includes an engine with an output power shaft configured to output power from the engine. The aircraft powerplant further includes a bypass fan, an electric machine, and a transmission. The transmission includes an input, a first output shaft, and a second output shaft. The output power shaft from the engine is configured to drive the input of the transmission. The first output shaft is coupled to the bypass fan. The second output shaft is coupled to the electric machine. The transmission is controllable to vary a percentage of the power from the engine between the first output shaft and the second output shaft such that a majority of the power is selectively provided to either the first output shaft or the second output shaft.

In an embodiment, an aircraft powerplant includes an engine having a shaft. The shaft is configured to output power from the engine. The hybrid aircraft powerplant further includes a bypass fan, a first electric machine, a second electric machine, and a gearset. The gearset includes a sun gear, a plurality of planet gears connected to a planet carrier, and a ring gear. The shaft is configured to drive an input of the first electric machine and drive the sun gear. The second electric machine is configured to drive the ring gear. The bypass fan is connected to the planet carrier.

In an embodiment, a method for splitting power output from an engine between a first electric machine and a bypass fan includes controlling, in a first mode of operation using a second electric machine, a gearset to direct power primarily or wholly to the first electric machine. The gearset includes a sun gear connected to an output shaft of the engine, a plurality of planet gears connected to a planet carrier, and a ring gear connected to the second electric machine. The planet carrier is connected to the bypass fan. The method further includes controlling, in a second mode of operation using the second electric machine and the engine, the gearset to direct power to a combination of the bypass fan and the first electric machine. The method further includes controlling, in a third mode of operation using the second electric machine and the engine, the gearset to direct power primarily or wholly to the bypass fan.

In an embodiment, a power transmission for an aircraft includes a shaft input configured to receive rotational power from an engine of the aircraft, a shaft output configured to output mechanical power to a propulsion mechanism of the aircraft, an electrical output configured to output electrical power, and an electric machine configured to receive the rotational power via the shaft input and selectively generate electrical power output via the electrical output. The electrical power is selectively generated by the electric machine being at least a majority of the rotational power received from the engine of the aircraft via the shaft input.

In an embodiment, a power transmission for an aircraft includes a shaft input configured to receive rotational power from a turbine engine of the aircraft, a shaft output configured to output mechanical power to a propulsion mechanism of the aircraft, an electrical output configured to output electrical power to an electric motor of the aircraft, an electric machine, a control system configured to selectively cause the electric machine to generate electrical power and output the electrical power out of the electrical output to the electric motor. The electrical power is selectively generated by the electric machine being at least a majority of the rotational power received from the engine of the aircraft via the shaft input. The control system is further configured to selectively cause the amount of electrical power generated by the electric machine to be less than a majority of the rotational power received from the engine while outputting the mechanical power to the propulsion mechanism of the aircraft.

In an embodiment, a method for splitting power output from an engine of an aircraft between an electric machine and a bypass fan includes receiving, via an input shaft of a power transmission, rotational power from the engine. The method further includes selectively splitting, with gearing, clutching, and/or transmission components of the power transmission, power output from the power transmission between a mechanical power output connected to a propulsion mechanism and an electrical output of the power transmission. An amount of power output at the electrical output is selectable to be a majority of the power input from the engine at the input shaft. The power output at the electrical output is generated by at least one electric machine of the power transmission.

In an embodiment, a power transmission for an aircraft includes an input power shaft configured to receive power from an engine of the aircraft, a propulsion mechanism, an electric machine, an output power shaft configured to output mechanical power to the propulsion mechanism, and an electrical output configured to output electrical power generated by the electric machine. The power transmission is controllable to vary a percentage of the power from the engine between electrical power being output at the electric machine and mechanical power output at the output power shaft. The power transmission is controllable such that a majority of the power is selectively provided to either the output power shaft or the electric machine.

In an embodiment, a method for splitting power output from an engine between a first electric machine and a propulsion mechanism includes controlling, in a first mode of operation, the first electric machine to generate electricity using most or all mechanical power output from the engine. The first mode further includes controlling a gearset using a second electric machine such that little or none of the mechanical power output from the engine is directed to the propulsion mechanism. The method further includes controlling, in a second mode of operation using the first electric machine and the second electric machine, the first electric machine to generate electricity using a first substantial portion of the mechanical power output from the engine and the gearset to cause a second substantial portion of the mechanical power output from the engine to be output to the propulsion mechanism. The method further includes controlling, in a third mode of operation, the first electric machine to generate very little or no electricity from the mechanical power output from the engine. The third mode further includes controlling the gearset using the second electric machine such that most or all of the mechanical power output from the engine is directed to the propulsion mechanism.

In an embodiment, a method for splitting power output from an engine between an electric machine and a propulsion mechanism includes controlling, in a first mode of operation, the electric machine to generate electricity using most or all mechanical power output from the engine. The first mode further includes controlling a gearset and/or clutches such that little or none of the mechanical power output from the engine is directed to the propulsion mechanism. The method further includes controlling, in a second mode of operation, the electric machine to generate very little or no electricity from the mechanical power output from the engine. The second mode further includes controlling the gearset and/or clutches such that most or all of the mechanical power output from the engine is directed to the propulsion mechanism

BRIEF DESCRIPTION OF THE DRAWINGS

FIG. 9 illustrates a block diagram representative of an aircraft control system for use with a hybrid powerplant having a turboshaft engine and a planetary gearset in accordance with various embodiments.

FIG. 10 is a flow chart illustrating use of a hybrid powerplant having a turboshaft engine and a planetary gearset engine core in accordance with various embodiments.

DETAILED DESCRIPTION

Figure 1:
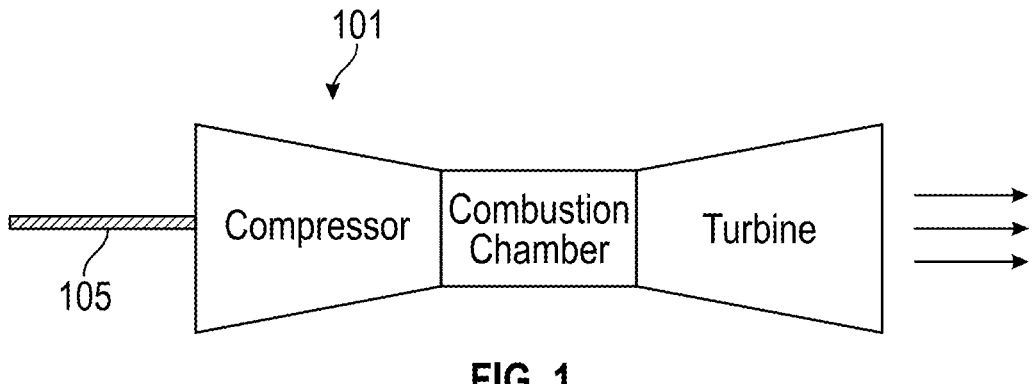
FIG. 1 illustrates a side cross-sectional view of a turboshaft engine in accordance with various embodiments.

One aspect of aviation flight is the ability to travel very fast through the air. The forward motion can be created by one or more propellers, one or more fans, or a number of jet engines. As higher speeds are prioritized, propellers may fall away as viable options and the only remaining solutions may be some form of turbine engine commonly called a turbofan or turbojet (e.g., some kind of turbine engine). Vertical takeoff may include hovering flight at zero or very low airspeed. Lift fans, rotors, or arrays of propellers may be used to create vertical lift at low or zero forward airspeed propel aircraft in vertical flight. For example, electrical power may be used to drive the vertical propulsion systems.

Therefore it may be desirable to have a powerplant that may selectively provide thrust like a turbofan or provide large amounts of electrical output for vertical thrust systems. Described herein are hybrid powerplants that can advantageously power an aircraft to takeoff and land vertically, while also facilitating faster horizontal flight than is possible using forward thrust mechanisms like propellers. This provides for aircraft that advantageously open up new opportunities for travel or transport of goods, such as by eliminating in many cases the need for any sort of prepared runway.

Described herein are various embodiments for a parallel hybrid powerplant system architecture built around a high-performance turbine engine. This solution advantageously provides for a turbine to act as normal by compressing outside air, adding fuel in a combustion chamber to raise the temperature and pressure, and discharging this heated air through one or more turbines to create usable shaft work (e.g., power). In various embodiments, different types of fuel may be used such as jet fuel (e.g., jet A, jet A-1, jet B, JP-1 to JP-10, JPTS, Zip fuel, TS-1, etc.), hydrogen fuel, diesel fuel, etc. or any other type of fuel based on the engine type. This usable shaft work (e.g., power) may advantageously be used to drive, among other things, a bypass fan to create forward thrust for the aircraft to which this device is attached, while also being capable of powering a very high output electric generator to feed high voltage and high-power energy via distribution wires to motors and/or other components, such as those that are adapted for vertical lift (e.g., for a vertical takeoff and landing (VTOL) aircraft). This combination of a turbine engine driving a ducted bypass fan for generating forward thrust for flight along with a blended transition to electric power generation powered by a turbine engine may advantageously facilitate and power flight modes as well as various accessories of an aircraft in ways not previously possible. In particular, in various embodiments described herein, a shaft of a turbine engine or other engine may be able to input power to a power transmission that selectively provides power output to a bypass fan (e.g., as in a turbofan) or an electrical power bus. The power transmission itself may include one or more electric machines capable of generating power or acting as a motor (e.g., an electric machine or emachine as used herein may be an electric generator, electric generator/motor combination, an alternating current (AC) motor, a direct current (DC) motor, etc.).

In various embodiments, an electric machine, turbine engine, and bypass fan may all be oriented along or about a single, or main, axis. The main axis may, for example, coincide with a shaft output of a turbine engine and/or an axis of rotation of a bypass fan. As such, the main axis along which a shaft of a turbine engine (e.g., a turboshaft) may serve as an axis along which more than one component may be oriented in a parallel fashion. In various embodiments, various components, such as an electric machine, may not be located within the single axis, but may be oriented along an axis parallel to a main axis. In such an example, the electric machine may still receive power from the shaft of a turbine engine along the main axis. While various embodiments described herein include a turbine engine with an output shaft, any engine with an output shaft may be used in accordance with the various embodiments described herein. That is, a certain type of engine is not necessary to implement various aspects of the systems and methods described herein, as emachines, a planetary gearset, a fan for generating thrust, and/or other components as described herein may be used with any engine that has an output shaft. Such engines may include any type of turbine engine, rotary engine, piston engine, or other type of engine.

In aviation, weight of an aircraft may be a primary concern and/or design constraint. A benefit of the parallel hybrid turbofan design having a power transmission, where the parallel hybrid turbofan may also referred to herein as a blended turbofan because it can produce any desired blend of mechanical and electrical output power, described herein is that one core thermal engine can produce two very different forms of propulsion on the same aircraft. In terms of thrust-to-weight ratio for atmospheric flight, a ducted bypass fan such as typically used on a turbofan engine is quite effective compared to other types of powerplants, which is why they find value, for example, on commercial airliners and business jets. As described herein, a turbine engine driving one or more motor/generator(s) (e.g., emachines) may also be used to efficiently create power on the order of one or many Megawatts (MW) of electric power that may be used in other aircraft to enable distributed electric propulsion, such as in vertical takeoff and landing (VTOL) aircraft. For example, an advantage of the embodiments described herein includes that mechanical and electrical power may be output, and that such output power may be split or blended between mechanical and electrical power across an entire range of output power. For example, the system may output 100% or near 100% of the output power from an engine (e.g., a turbine engine) to a mechanical output and very little to no power to an electrical output. The same system may output 100% or near 100% of the output power from an engine (e.g., a turbine engine) to an electrical output and very little to no power to a mechanical output. When the output power is completely or nearly completely electrical output power, this may mean there is little to no output to a primary forward thrust mechanism (e.g., a propeller, bypass fan, or other propulsion mechanism) and therefore there is little to no forward thrust being generated mechanically by a mechanical primary forward thrust mechanism. Furthermore, if the turbine engine chosen is a turboshaft or turboprop engine, such a configuration may favor extraction of shaft power vs. direct thrust and may have little to no residual thrust which may be advantageous for VTOL operations. This may be advantages for certain types of aircraft, such as VTOL aircraft. Other benefits to the various embodiments herein may include improved center of gravity of powerplant components, efficient cooling, and control.

The powerplants described herein may therefore be advantageously useful in aircraft that are design for high-speed travel but also use distributed electric propulsion (DEP), or otherwise have large electrical power demands. DEP applications may include uses in aircraft such as VTOL, boundary layer control, blown wing for short-take-off-and-landing (STOL), or other unique applications of DEP. For example, described herein are hybrid powerplants based around a turbofan engine that is configured to deliver forward thrust via a bypass fan, with the added capability to generate high electrical power output for uses such as propulsion or other electrical uses on an aircraft (e.g. accessories that use high amounts of electrical power).

FIG. 1 illustrates a side cross-sectional view of a turboshaft engine 101 in accordance with an illustrative embodiment. In various embodiments, other types of turbines or engines than that shown in FIG. 1 may be used. In any embodiment, the engine may have an output shaft, similar to shaft 105 of FIG. 1. The example turboshaft engine 101 in FIG. 1, which may also be referred to as a turbine engine, may have a compressor section, a combustion chamber, a turbine, and exhaust. The turbine engine 101 may output rotational power via the shaft 105. Any of the embodiments described herein may use a turbine engine such as that shown in FIG. 1 or any other type of engine to output power via a shaft such as the shaft 105.

A turbine engine, such as the one in FIG. 1, may be characterized by certain core elements comprising a compression section, which may include various stages from 1 to many, and may include one or more axial and/or centrifugal compressors in any combination and number. A turbine engine may further include a combustor or series of combustion chambers where fuel is introduced along with the compressed air to raise the temperature and pressure of the air, and one or more turbine blades to extract usable work from the high-pressure and high-temperature gases resulting from combustion. The turbine stages may be axial, and there may be any number from typically 1 to 4 or more, depending on the turbine engine. The turbine blades may turn any number of unique shafts that pass through the central axis of the turbine engine and these multiple shafts may not all turn in the same direction. In many cases, the high-pressure turbine which is first to contact the combustion gases creates shaft work to power the compressor sections, and a second turbine section often called the low-pressure turbine may be used to power elements outside the core turbine engine such as bypass fans, helicopter rotors, or other devices. In some turbine engines, a third shaft may be present such that two shafts power two separate compressor stages and may be driven by two separate turbine sections, with a third turbine section providing power for elements outside the core turbine engine such as bypass fans, helicopter rotors, or other devices. Finally, gearing may be used on one or more of the shafts of a turbine engine to change the characteristic rotations per minute (RPM) or RPM range between a shaft inside the core which might turn at an advantageously high RPM and a shaft used to power elements outside the core engine which might turn at an advantageously lower RPM. In the example of FIG. 1, gearing may be present at the end of the shaft 105 before connecting to other components of a powerplant, such that the RPM output to another device is lower or different than the RPM output by the turbine engine itself.

A core turbine engine concept as described herein may be applied in different ways, and different terminology may be used herein to refer to different applications of a turbine engine. For example, one application of turbine engines may be referred to as a turboshaft. In a turboshaft, the output shaft work from the low pressure (LP) turbine section (e.g., where there are multiple turbine sections) may be provided to a flight vehicle via an output shaft. This shaft may turn at the same RPM as the LP turbine wheel itself (referred to herein as N1) and may also be geared to provide output at a different RPM. Turboshaft engines may also be used as input power to drive a gearbox in a helicopter application, and the output of that gearbox may be used to drive the main rotor of the helicopter.

Another application of turbine engines may be referred to as a turboprop. In a turboprop, the engine manufacturer may include a substantial gearbox in the turbine engine assembly to reduce the N1 turbine output RPM to a much lower RPM with much higher torque. This output shaft may then be designed to attach directly to a large propeller, such may be seen on propeller-driven commercial aircraft or a small general aviation aircraft. Therefore, in various embodiments described herein, the mechanical output may be to a propeller or similar propulsion mechanism similar to a turboprop rather than to a ducted bypass fan. In various embodiments, a propeller or other propulsion mechanism being mechanically driven may also optionally be ducted. In various embodiments, a mechanical output of a system may drive one or more propellers or propulsion mechanism using the various embodiments described herein.

Vertical takeoff and landing (VTOL) capabilities may be advantageous for an aircraft where it is desirable to avoid traditional runway usage/dependence. In contrast, winged aircraft that generate lift during forward motion may use significantly less power than aircraft that rely solely on powered lift that may be required for VTOL aircraft. Accordingly, it may be desirable to design aircraft and aircraft powerplants such that the aircraft is capable of VTOL, while also being capable of transitioning to forward flight that utilizes lifted generated by wings. As such, described herein are various hybrid electric powerplants that provide for high power mechanical output for forward flight (e.g., a fan or propeller powered by a shaft of a turbine engine) while also providing high power electric output for VTOL devices (e.g., electric motor driven propellers powered by electricity generated from a generator based on power from a shaft of a turbine engine). By providing both high levels of mechanical and electrical power in various modes of flight, an aircraft may be capable of VTOL as well as transitioning to forward flight using winged lift to provide both runway independence (e.g., VTOL) while also requiring less power for forward flight (e.g., based on use of winged lift). In various embodiments, the level of mechanical or electrical power output can be blended, or one of the two can maximized while the other is minimized. While the electrical power is maximized to at or near full output (e.g., most or all of the output of an engine is output as electrical power), a mechanical output to a propulsion mechanism (e.g., bypass fan, propeller, etc.) may be at or near zero, which may be advantageous for certain aircraft such as VTOL aircraft.

The term electric machine (or emachine) may also be used herein to refer to any of a generator, a motor, or a generator/motor combination, as an alternating current (AC) motor may also operate as a generator. Similarly, an AC generator may also be operated as a motor by changing the control and commutation strategy. In other words, any emachine, motor, or generator referenced herein may operate as or may be any of a motor and/or generator. In various embodiments described herein, the use of such a motor/generator may not be to take power from an onboard energy storage system and add shaft power to supplement or replace the power of the core engine, but may be to extract power created by an LP turbine and transmitted by a shaft such as shaft 105 and operate as a generator to create very high electrical power for other use on the aircraft (though in some modes of operation power may be applied to the shaft of a turbofan by an electric machine operating as a motor). This power may be, for example, at a high voltage at or above approximately 400 volts (V), or anywhere from 400V to 3 kilovolts (kV). For example, nominal voltages of such a system may include 400V, 800V, 1000V 1200V, 1500V, 2.4 kV, or 3 kV. However, in various embodiments, the use of the emachine may also include using power from a power source or energy storage device such as a battery or a supercapacitor to output power from the emachine to the shaft 105. In various embodiments, an inverter or other voltage conversion device may be used to convert AC power output from an individual emachine to match the nominal DC voltage of an aircraft system or bus.

Such a high voltage and/or high current electrical power may be used for propulsion, lift, and/or control in an aircraft featuring one or more electric motors driving fans, propellers, or other devices. Such high voltage and/or high current may also be used for any other functions on a given aircraft requiring high electrical power. The total electrical output of a turbofan with an emachine as described herein may, for example, be used for one or a combination of accessories or other aspects of an aircraft than propulsion or thrust, such as an auxiliary power unit (APU), an air conditioning system, avionics, high-power accessories such as those that may use power of one megawatt (1 MW) or even greater.

In various embodiments, the motor/generator or emachine may be located anywhere along the length of the turbofan engine inside or outside of a turbofan engine housing and/or nacelle housing. In an embodiment, the motor/generator may be a short distance forward of the bypass fan (e.g., housed in the shroud (spinner) of the turbofan) or farther forward and more distant from the bypass fan, may be between the turbine core engine and the bypass fan, or may be behind the turbine engine. As described herein, in various embodiments, multiple emachines or motor/generators may be used in a hybrid electric powerplant for an aircraft. As such, one or more of the emachines in such instances may be located in the various positions described herein, such as within a turbine or nacelle housing or any other location described herein. As also described herein, the emachine(s) may also be oriented along an axis of the turbine engine and/or output shaft of the turbine engine, including such that an axis of an emachine coincides with the axis of the turbine engine and shaft or such that an axis of an emachine does not coincide with the axis of the turbine engine and shaft but is still parallel to the axis of the turbine engine and shaft. In other words, various aspects of a power transmission as described herein (e.g., gearing, clutches, emachines, etc.) may be located inside or outside a housing or nacelle of an engine. For example, a shaft may pass through a nacelle or housing to an emachine outside of the nacelle or housing such that electrical power may be generated by the emachine or provided to components within the nacelle or housing.

Advantageously, the embodiments herein therefore provide for a systems, methods, and computer readable instructions for managing the power transmitted by the turbine output shaft (main exit from the LP turbine as outside power used to do something valuable outside the core engine). Whether this output shaft is from a turbofan engine, turboshaft engine, or a turboprop engine (one or all of which may generally be referred to herein as a turbine engine), there may be gearing or gearing associated with the turbine engine may be removed such that shaft power is available for use at the N1 speed, which is the speed the shaft is turned by the LP turbine blade wheel(s) itself. In other words, power output by the shaft (e.g., shaft 105 of FIG. 1) may be output at the same RPM as the LP turbine section of the turbine engine is rotating. That N1 shaft RPM may be, for example, in a range from 10,000 to 40,000 RPM, and may for example be approximately 10,000, 15,000, 20,000, 25,000, 29,000, 30,000, 35,000, 40,000, etc. in various embodiments. As such, the RPM output to power blending device(s) described herein may be the same as an RPM output of the turbine engine itself (e.g., N1 speed). In embodiments where the RPM output of the turbine engine (e.g., N1 speed) is stepped down by gearing, a different RPM may be delivered to the power blending device(s) described herein.

As described further herein below, an example power blending device for splitting power between mechanical power (e.g., to drive a bypass fan for forward flight) and electrical power (e.g., to be generated by an emachine for use by vertical flight components of an aircraft) may include a rotor of an emachine connected to the output shaft (e.g., shaft 105 of FIG. 1), where the emachine is designed to operate as a motor and/or a generator. Such a rotor section may rotate at the speed of the turbine output shaft (e.g., N1 speed) within an outside stator of the emachine, which may be fixed and attached to a suitable nearby stationary reference. If the field current to the stator is low or zero, the rotor may spin while the emachine may consume and produce zero or very minimal net power. In this phase, the rotor of the emachine may therefore be spinning but may be neither adding shaft work (as a motor) nor absorbing shaft work (as a generator). In this state, substantially all of the available shaft power from the turbine engine may therefore pass through the emachine and be available for other use (e.g., driving flight propellers/fans). In other embodiments, it may be desirable to not have a rotor spinning within an emachine while shaft power from a turbine engine is delivered to a mechanical device (e.g., bypass fan). In such embodiments, the rotor of the emachine may be disengaged from the shaft outputting power from the turbine engine. As described herein below, such a transmission may be a synchromesh gear, such as one similar to those used in automotive transmissions, or any other type of device suitable for coupling or decoupling a rotor of an emachine to a shaft passing therethrough. An emachine may be configured in an inrunner configuration where the rotor of an emachine spins within the stator. In such embodiments, and input connected to the rotor that spins the rotor within the stator may be a shaft as described herein. In various embodiments, an emachine may be configured in an outrunner configuration, such that a spinning component or element of the emachine (e.g., the rotor) is situated toward an outside of the emachine rather than the inside (e.g., with the stator inside of the rotor). Such outrunner emachines may be used in the various embodiments described herein as desired. As such, a shaft connected to the spinning component may connect to the outer spinning component and the shaft may have a hollow center like the rotor itself. A spinning component or element may also be referred to herein as either a rotor in the middle of an emachine or as the outer (or any other) portion of an emachine that spins in an outrunner emachine design. In other words, any portion of an emachine that spins may be referred to herein as a spinning component or element, regardless of the design type of the emachine.

Figure 2A:
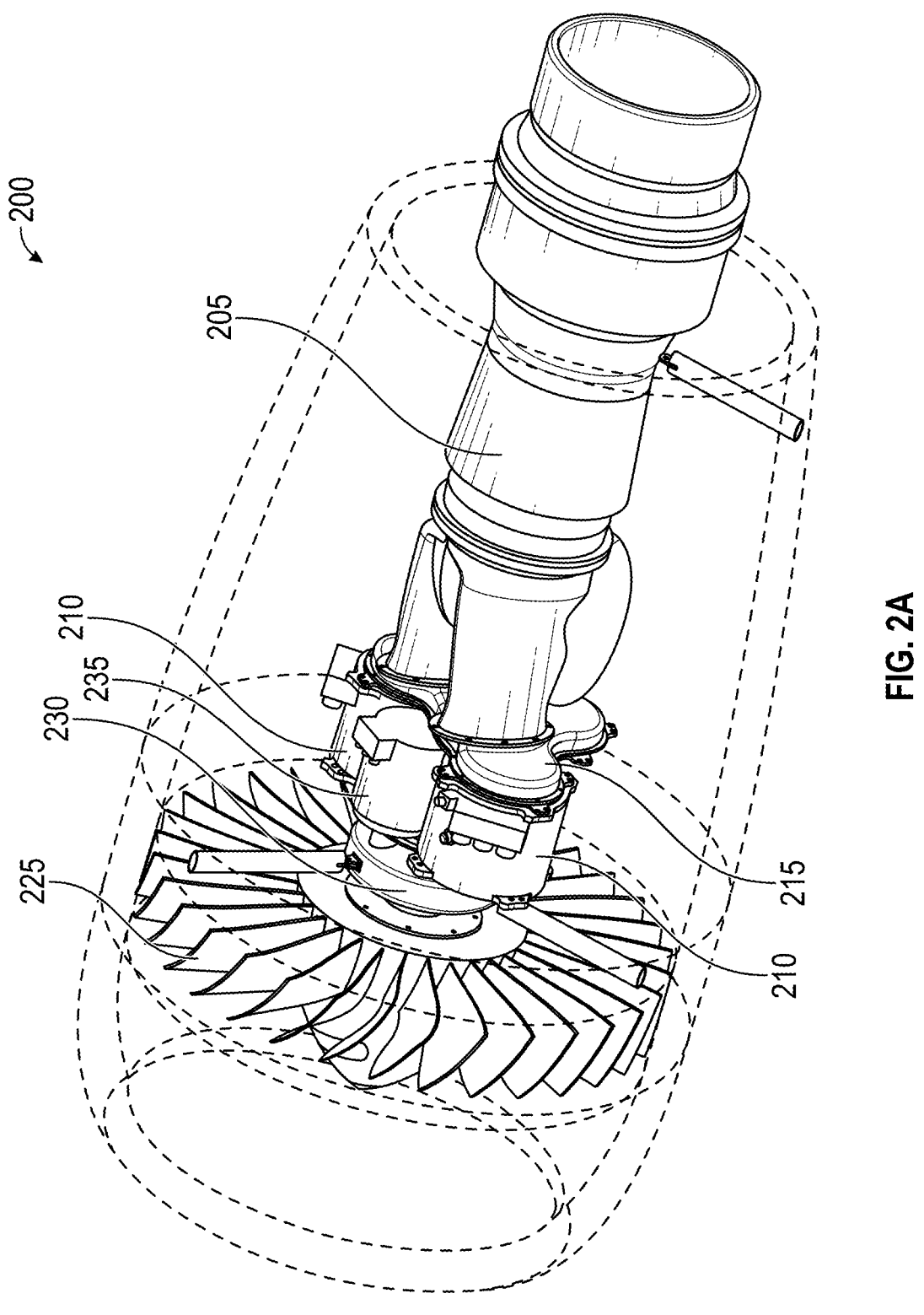
FIGS. 2A-2D illustrate an example hybrid turboshaft engine with a planetary gearset and four electric machines in accordance with various illustrative embodiments.
Figure 14:
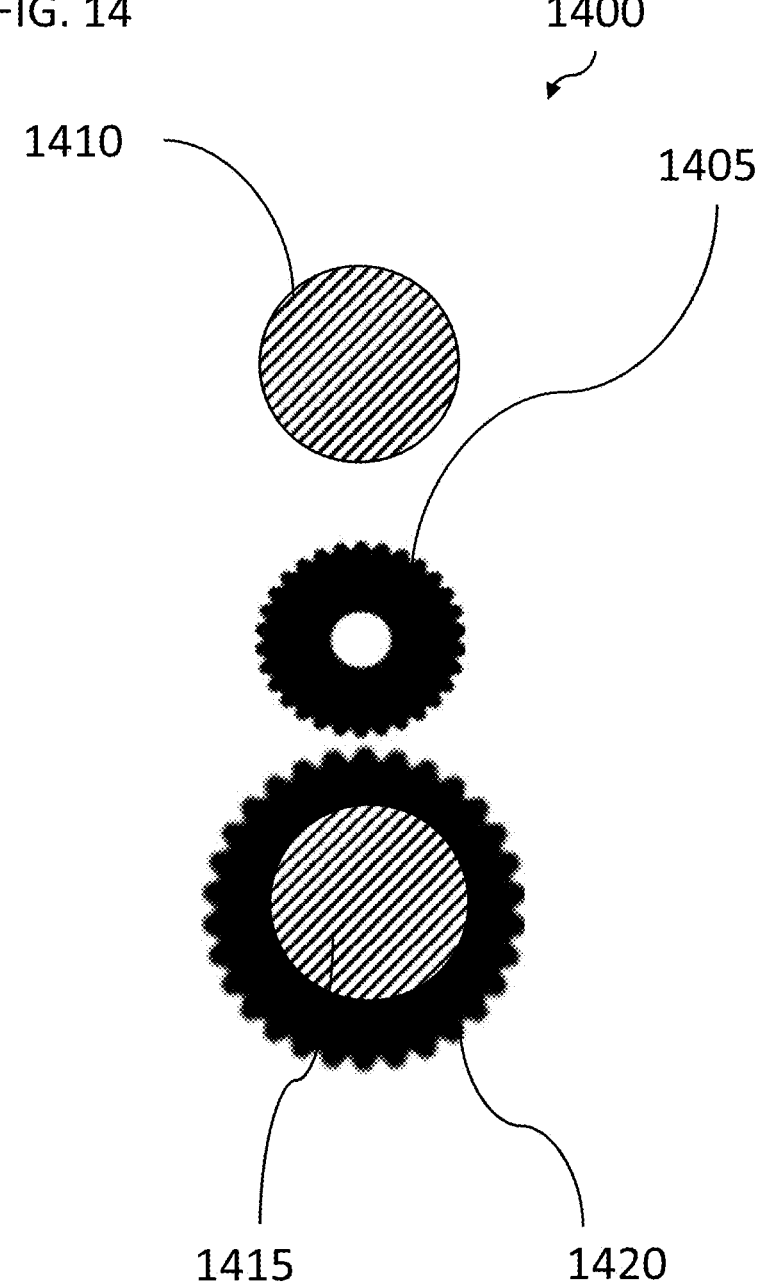
FIG. 14 illustrates an example system with a planetary gearset and two electric machines in accordance with various embodiments.
Figure 15:
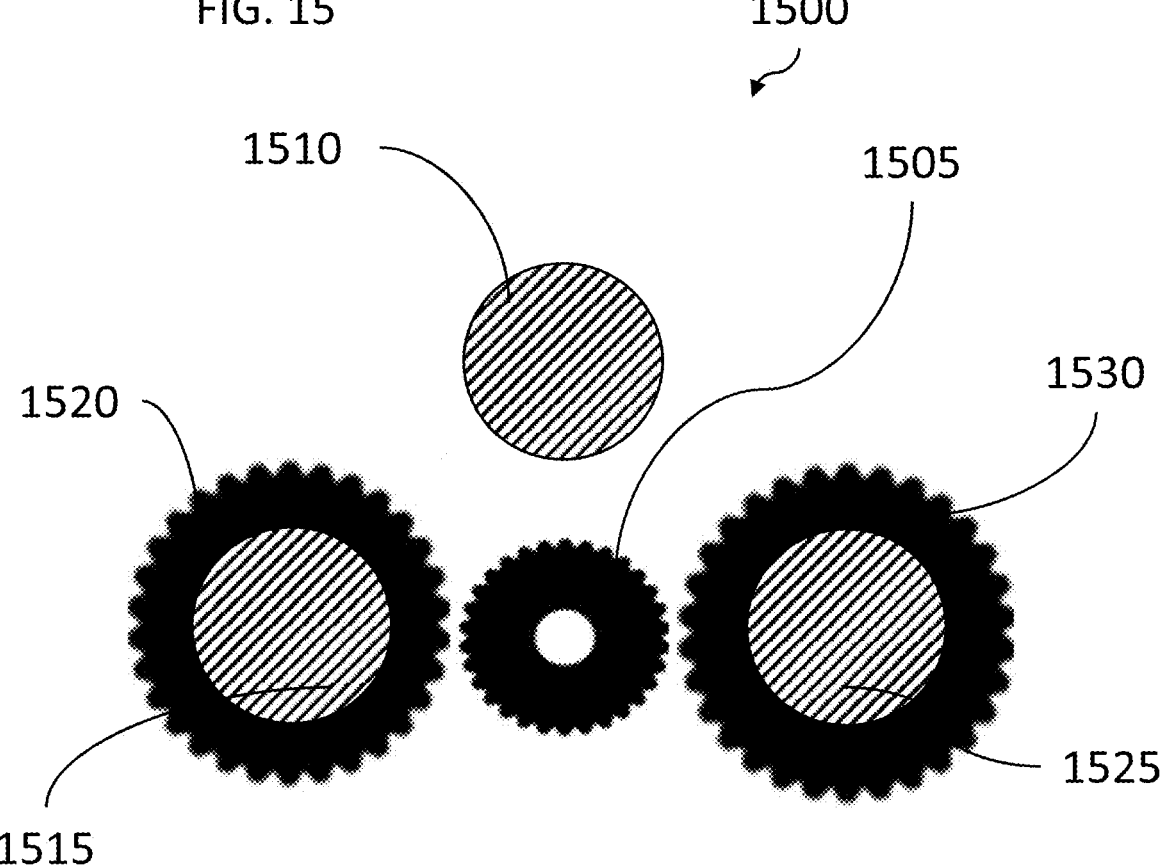
FIG. 15 illustrates an example system with a planetary gearset and three electric machines in accordance with various embodiments.
Figure 16:
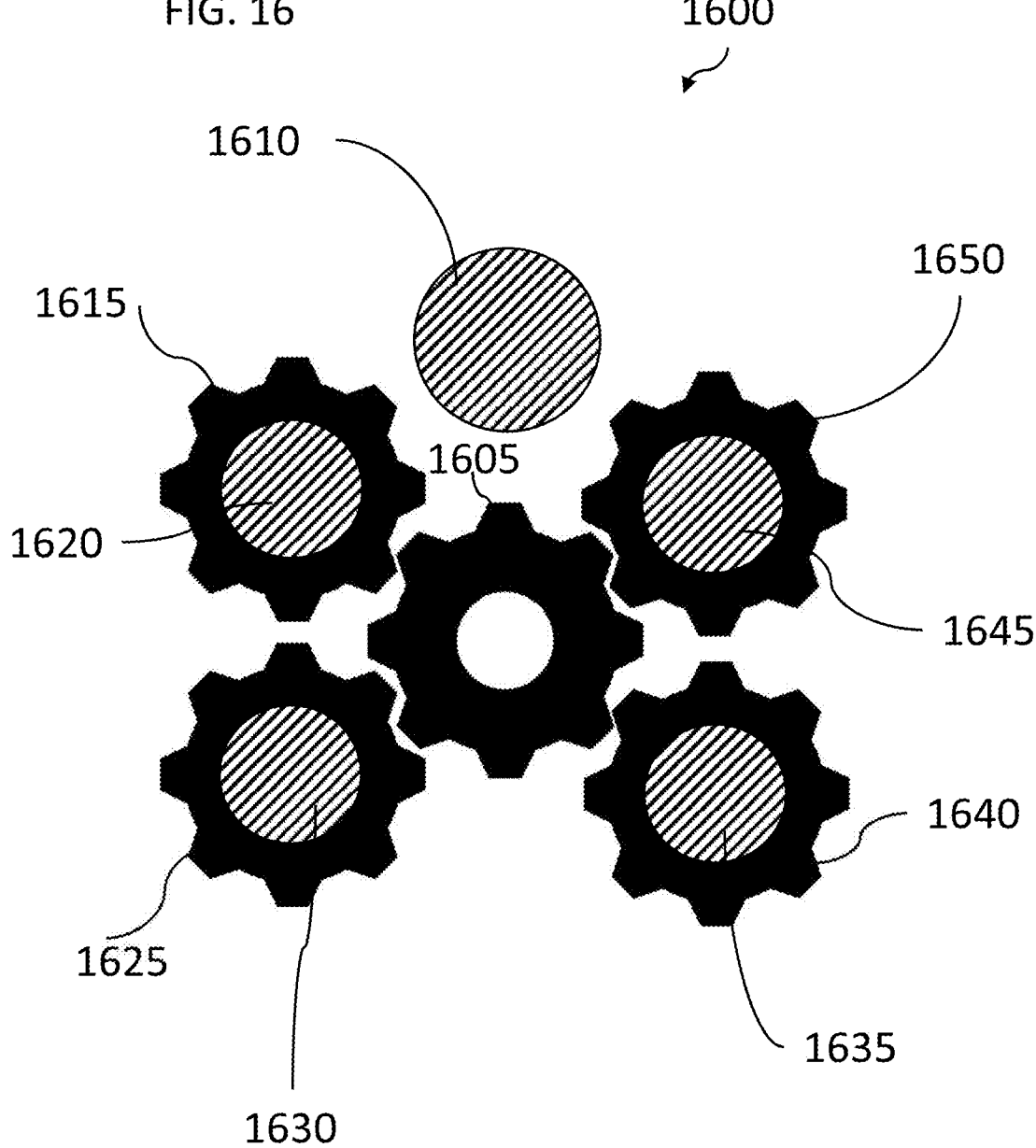
FIG. 16 illustrates an example system with a planetary gearset and five electric machines in accordance with various embodiments.

FIG. 2A is a perspective view of a system 200 having a turboshaft engine 205 and three electric machines 210 that are configured to generate electric power from an output of the turboshaft engine. FIGS. 2A-2D specifically show an embodiment where more than one emachine is used to generate electrical power from the rotation of a shaft 255 output of the turbine engine 205. As shown in and described further with respect to FIGS. 4-6, multiple emachines 210 may be placed around a shaft of the turbine engine 205 such that axes of each of the emachines 210 are parallel to an axis of the output shaft of the turbine engine 205. In various embodiments, one or more emachines may be oriented at an angle compared to an axis of the output shaft 255 of the turbine engine 205. For example, an angle between an axis of an emachine and the output shaft 255 may be anywhere from 0 degrees to 90 degrees, such as any of 0 degrees, 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, or 90 degrees. Such angles may be facilitated at least in part by the use of gearing, such as bevel gears, between the output shaft of a turbine engine and a shaft of an emachine (e.g., as shown further in FIG. 2B). Gearing may be attached to the emachines 210 and the output shaft 255 of the turbine engine 205 so that the output shaft 255 may drive all of the emachines 210 (e.g., as shown further in FIG. 2B). While the example of FIGS. 2A-2D and 4-6 includes three emachines driven by an output shaft of a turbine engine, other numbers of emachines may be used than three, including in embodiments where each emachine is placed around an output shaft. For example, FIGS. 14-16 are discussed further herein and show example embodiments where one, two, or four emachines are driven by an output shaft of a turbine engine, respectively.

FIG. 2A further shows a housing 215 that may contain gearing connecting inputs of the emachines 210 to the shaft 255 of the turbine 205. In other words, gearing within the housing 215 may connect the shaft 255 of the turbine 205 to spinning components of the emachines 210 so that the emachines may generate electrical power based on the mechanical rotational input from the shaft 255 of the turbine 205. In various embodiments, components such as transmissions or clutches between the output shaft 255 and the spinning components of the emachines 210 may provide for selective engagement or disengagement of the shaft 255 from the spinning components of the emachines 210. In various embodiments, state current may also be removed from a spinning component of the emachines 210 so that they do not generate electrical power even when their respective spinning components are spinning.

Figure 2B:
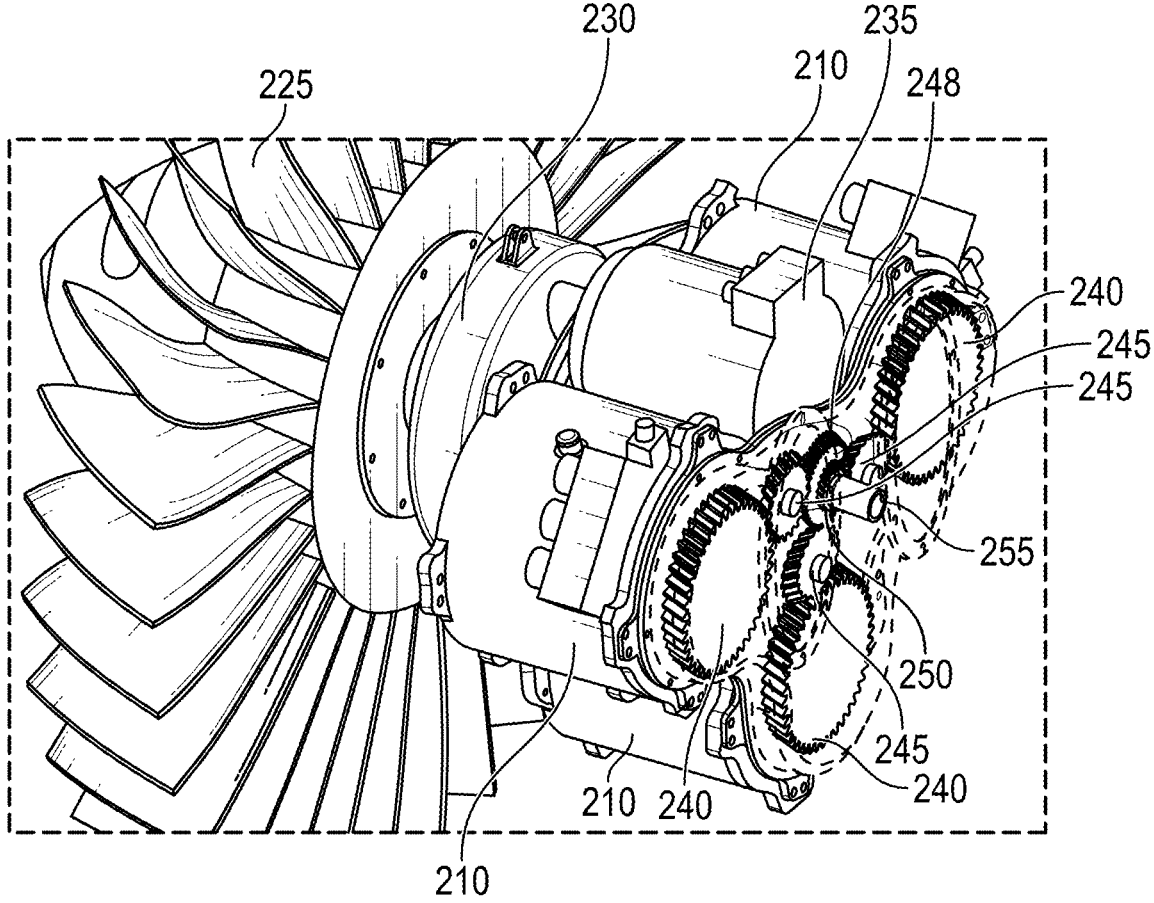
Figure 2C:
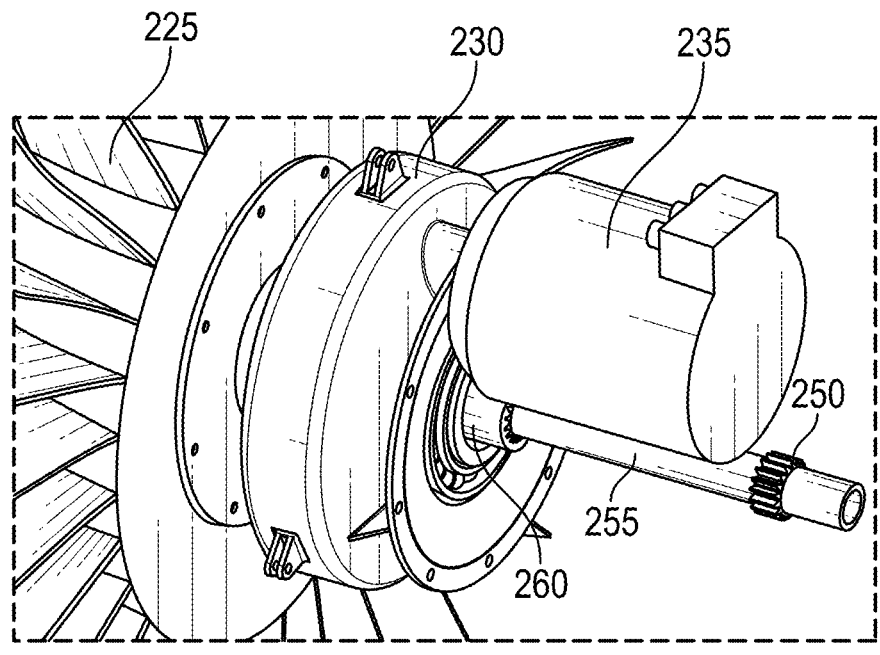
Figure 2D:
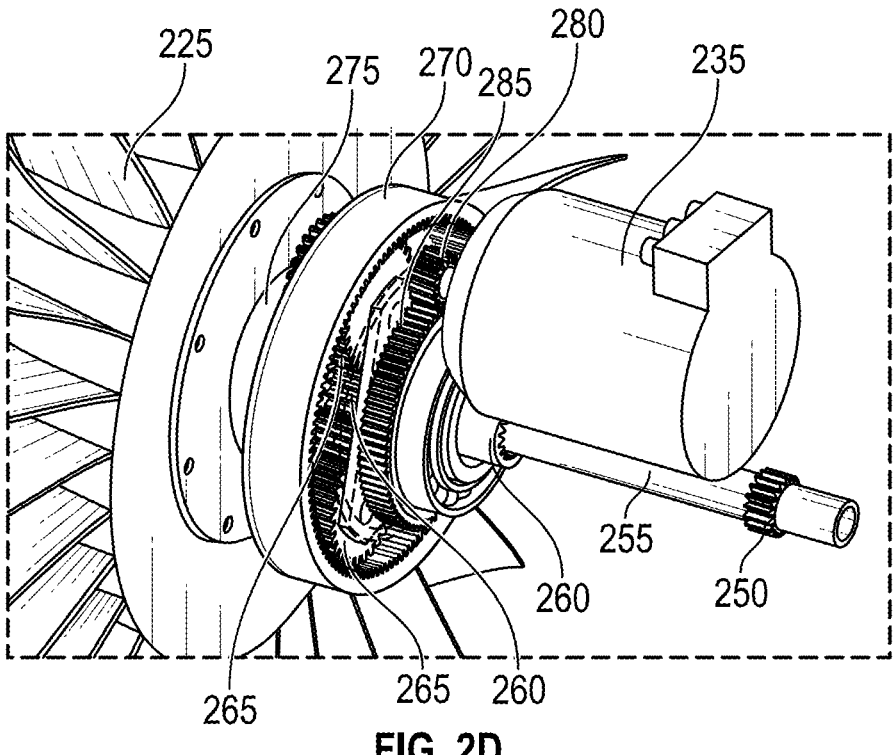

FIG. 2A also shows an emachine 235 that may be used to spin/control or be spun by a ring gear of a planetary gearset, as further shown in and discussed with respect to FIG. 2D. FIG. 2A further shows a bypass fan 225 and a housing 230 for a planetary gearset, such as those described further herein. While FIGS. 2A-2D demonstrate a single planetary gearset, various embodiments may use more than one planetary gearset in series to achieve a desired mechanical output rotations per minute (RPM) as desired for a given application.

FIG. 2B illustrates a perspective view of the system 200 with the turbine engine 205 and a portion of the housing 215 hidden. As such, a spline 250 attached to the shaft 255 may connect to gearing to power the emachines 210. In particular, the spline 250 may turn along with a gear 248, which turns along with gears 245, one each associated with each of the emachines 210. The gears 245 then respectively turn along with gears 240, where the gears 240 are connected to or are an input/output for each of the emachines 210 (e.g., a rotor or other spinning component of the emachines 210). The spline 250 and gears 240, 245, and 248 therefore also may be used to step down or up the RPMs between the shaft 255 and the spinning components of the emachines 210 as desired.

FIG. 2C illustrates a perspective view of the system 200 with the turbine engine 205, the housing 215, and the emachines 210 hidden. In particular, FIG. 2C shows how the emachine 235 extends into the housing 230, so that the emachine 235 may be used to control a ring gear of a planetary gearset, as further shown in and described with respect to FIG. 2D. Further, the shaft may further have a spline or gear that attaches to and turns along with a sun gear 260 (or a gear otherwise rigidly affixed to a sun gear of a planetary gearset) as described herein.

FIG. 2D further illustrates a perspective view of the system 200 with the turbine engine 205, the housing 215, the emachines 210, and the housing 230 hidden. The emachine 235 is connected to a gear 280, so that the spinning component of the emachine 235 may spin or be spun by way of the gear 280. In various embodiments, the state current of a spinning component of the emachine 235 may be removed and/or a transmission or clutch may be used to selectively engage or disengage a spinning component of the emachine 235 from the gear 280. The gear 280 turns along with a gear 285. Though transparent or not visible in FIG. 2D, a rigid member connects the gear 285 and a ring gear 270 of a planetary gearset, such that each of the spinning component of the emachine 235, the gear 280, the gear 285, and the ring gear 270 may turn together. By virtue of this gearing, the RPMs between the ring gear 270 and the gear 280 may be stepped up or down as desired.

The sun gear 260 may turn along with planet gears 265 as further described herein. The planet gears 265 may be connected to a planet carrier 275 that is rigidly connected to the bypass fan 225. In this way, when the planet carrier 275 rotates, the bypass fan 225 also rotates as further described herein.

Figure 3A:
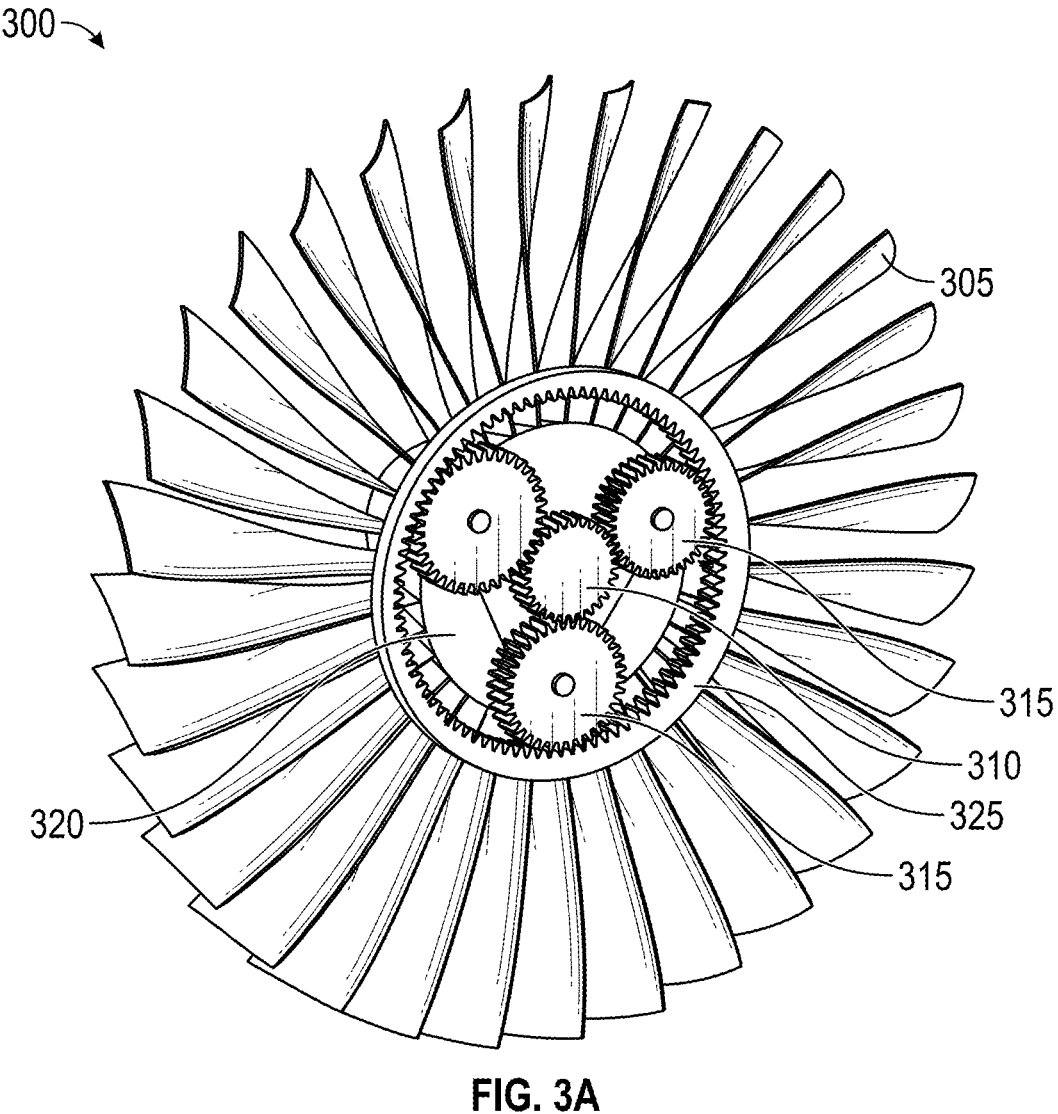
FIG. 3A is a perspective view of an example bypass fan with a planetary gearset in accordance with various embodiments.

FIG. 3A is a perspective view of an example system 300 having bypass fan 305 with a planetary gearset in accordance with an illustrative embodiment. The hybrid engines described herein may split power between a mechanical output (e.g., to drive the bypass fan 305) and an electrical output (e.g., the emachines 210 of FIGS. 2A & 2B). One component may be used, along with other components, to achieve the splitting or balance of power output type desired. In particular, as further described below, the planetary gearset may function as an on/off switch for getting thrust from a bypass fan.

For the electrical output (e.g., via the emachines 210 of FIGS. 2A & 2B), the emachines may be configured to generate electrical power based on input from an output shaft of a turbine engine based on whether a field current is applied to a stator of an emachine and/or if a clutch, transmission, or similar connecting a turbine engine output shaft and a shaft of an emachine is engaged as described herein below. The mechanical output (e.g., to drive the bypass fan 305) may be driven and turned on/off using the planetary gearset, as further described herein.

The gear set includes a sun gear 310, which rotates along with planet gears 315. The sun gear 310 may be connected to an output shaft of a turbine engine, such as the shaft 105 of FIG. 1 or an output shaft 255 of the turbine engine 205 of FIGS. 2A-2D. The planet gears 315 may be connected to planet carrier 320, which may also be connected to the bypass fan 305. The planet gears 315 also rotate along with a ring gear 325. The ring gear 325 may be driven by and connected to another emachine (not shown in FIG. 3A).

In this way, power may be input to the gearset (or absorbed from the gearset) by the output shaft of a turbine engine via the sun gear 310 and/or by an emachine via the ring gear 325. In this way, the emachine may cause the ring gear 325 to rotate such that the planet gears 315 either (i) rotate at a speed such that the planet carrier 320 does not rotate (and therefore the bypass fan 305 does not rotate) or (ii) rotate at a speed such that the planet carrier 320 does rotate (thereby causing the bypass fan 305 to rotate). In this way, the bypass fan 305 may be switched on or off, or the speed of the bypass fan may otherwise be adjusted, based on the control of the emachine connected to the ring gear 325 relative to the speed of an output shaft connected to the sun gear 310.

Similarly, to the extent the output speed of the shaft of a turbine engine is controllable, the planetary gearset of FIG. 3A (as well as the speed of the bypass fan) may therefore also be controllable based on the controllable output of the turbine engine. For example, rotations per minute (RPM) of a turbine engine may be controllable over a range of a target N1, such as approximately 82% of a target N1 speed up to 105% of a target N1 speed. In various embodiments, speeds above or below a target N1 speed may not be practical or possible to operate at without stalling a turbine engine or damaging a turbine engine. In other words, the speed at which the bypass fan 305 is rotating (or not rotating) may be controlled using a turbine engine and an emachine connected to, for example, the sun gear 310 and the ring gear 325, respectively. In this way, with the sun gear 310 spinning, the planet carrier 320 stopped, and ring gear 325 driven by an emachine connected to the ring gear 325 to spin at a correct speed based on an RPM of the sun gear 310, the bypass fan 305 is off. With the emachine connected to the ring gear 325 acting to drag down the RPM/spin rate of the ring gear 325 to get the planet carrier 320, and therefore also the bypass fan 305, moving, causing an output of thrust from the bypass fan 305.

Figure 3B:
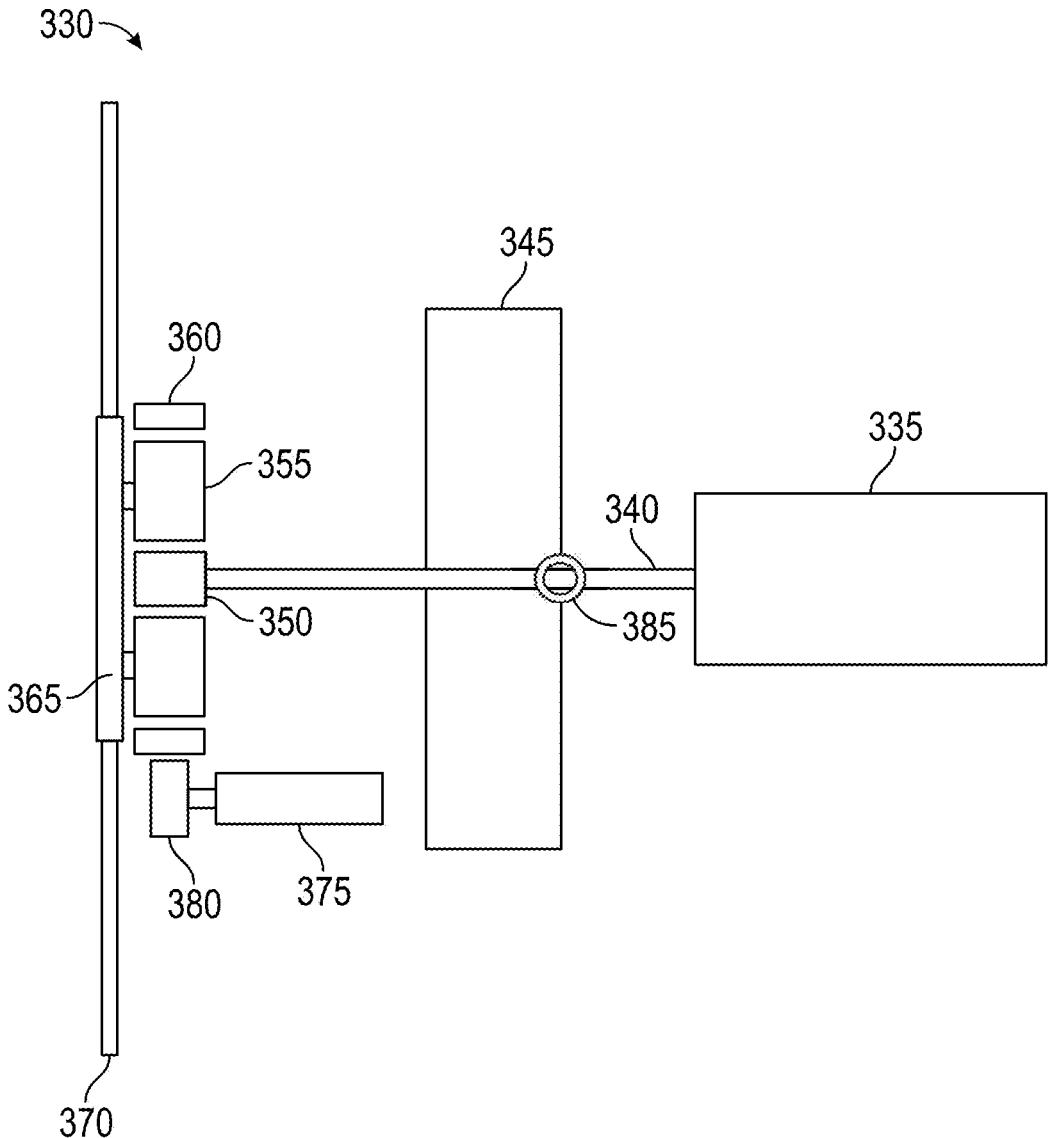
FIG. 3B is a schematic showing an example bypass fan with a planetary gearset, an electric motor/generator, and a turbine engine in accordance with various embodiments.

FIG. 3B is a schematic showing a cross-section of a system 330 with an example bypass fan 370 and a planetary gearset, a first emachine 345, a second emachine 375, and a turbine engine 335 in accordance with an illustrative embodiment. In particular, the turbine engine 335 includes an output shaft 340 that runs through the emachine 345 and connects to a sun gear 350 of the planetary gearset. As described with respect to FIG. 3A, the sun gear 350 rotates with the planet gears 335, which in turn rotate with a ring gear 360. The planet gears 355 are also connected to a planet carrier 365, which is connected to a bypass fan 370. The emachine 375 output may be connected to a gear 380 that rotates with the ring gear 360, so that the rotation of the planet carrier 365, and therefore the bypass fan 370, may be controlled as described herein. In various embodiments, as described herein, a rotor of the emachine 345 may rotate even while the emachine 345 is not generating power from the output shaft 340. However, in other embodiments, a transmission 385 (e.g., a synchronized gear or clutch) may be used to engage or disengage the rotor of the emachine 345 from the shaft 340. In this way, the shaft 340 may spin within the emachine 345 without rotating a rotor of the emachine 345 while the transmission 385 is disengaged. While one possible specific configuration is shown in FIG. 3A, other arrangements of similar, additional, or different components as shown in FIG. 3A may be used.

By using such a gearset as shown in FIGS. 3A and 3B, power blending may be accomplished, and different modes of power output may be accomplished. For example, in a mode E (e.g., electrical power desired), the planet carrier 365 which is attached to the bypass fan 370 does not spin. Because the sun gear 350 is spinning this necessarily means that the planet gears 355 are spinning on their respective individual axes. As long as the ring gear 360 is rotating in the opposite direction at an RPM dictated by the gear ratios of the planetary gearset, the planet gears 355 may spin on their respective axes, but the planet carrier 365 would not rotate and the bypass fan 370 would be stopped. In various embodiments, the ring gear 360 may spin naturally as a result of the planet carrier 365 being fixed in some way, such as with a pin, lock, band clutch, or other type of locking mechanism connected to an unmoving reference structure. The pin, lock, band clutch, or other type of locking mechanism may also be electronically controlled, such as by a controller or processor, such that locking of the planet carrier 365 may be accomplished by a control system of an aircraft or of the hybrid powerplant. Assuming that the planet carrier 365 and the bypass fan 370 are not locked in some manner, then maintaining mode E may require the ring gear 360 to be driven in a suitable direction, at a suitable speed, and with suitable power to maintain the planet carrier 365 in a stable position even while the sun gear 350 is spinning at high speed (e.g., based on the output shaft 340 speed). This may advantageously be accomplished by the use of the separate emachine 375. The emachine 375 may therefore be controlled with a direction and RPM that is adapted to this purpose.

In a mode T (e.g., forward thrust desired), the ring gear 360 may be stopped and the planet carrier 365 will rotate at an RPM dictated by the ratio of radius between the sun gear 350 and the planet gears 355. With this rotation of the planet carrier 365 which is attached to the bypass fan 370, the bypass fan 370 will absorb the power applied by the turbine output shaft 340 through the sun gear 350 and create airflow leading to forward thrust. In various embodiments, motion of the ring gear 360 may also be stopped by the application of field current to the emachine 375 or by some other mechanical or controllable electromechanical pin, lock, band clutch, brake, or other type of locking mechanism. In various embodiments, such a locking mechanism as an electromechanical pin, lock, band clutch, brake, or other type of locking mechanism may be used without the use of the emachine 375 (e.g., various embodiments may not have a second emachine that outputs power to or absorbs power from the gears in a planetary gearset).

Figure 7:
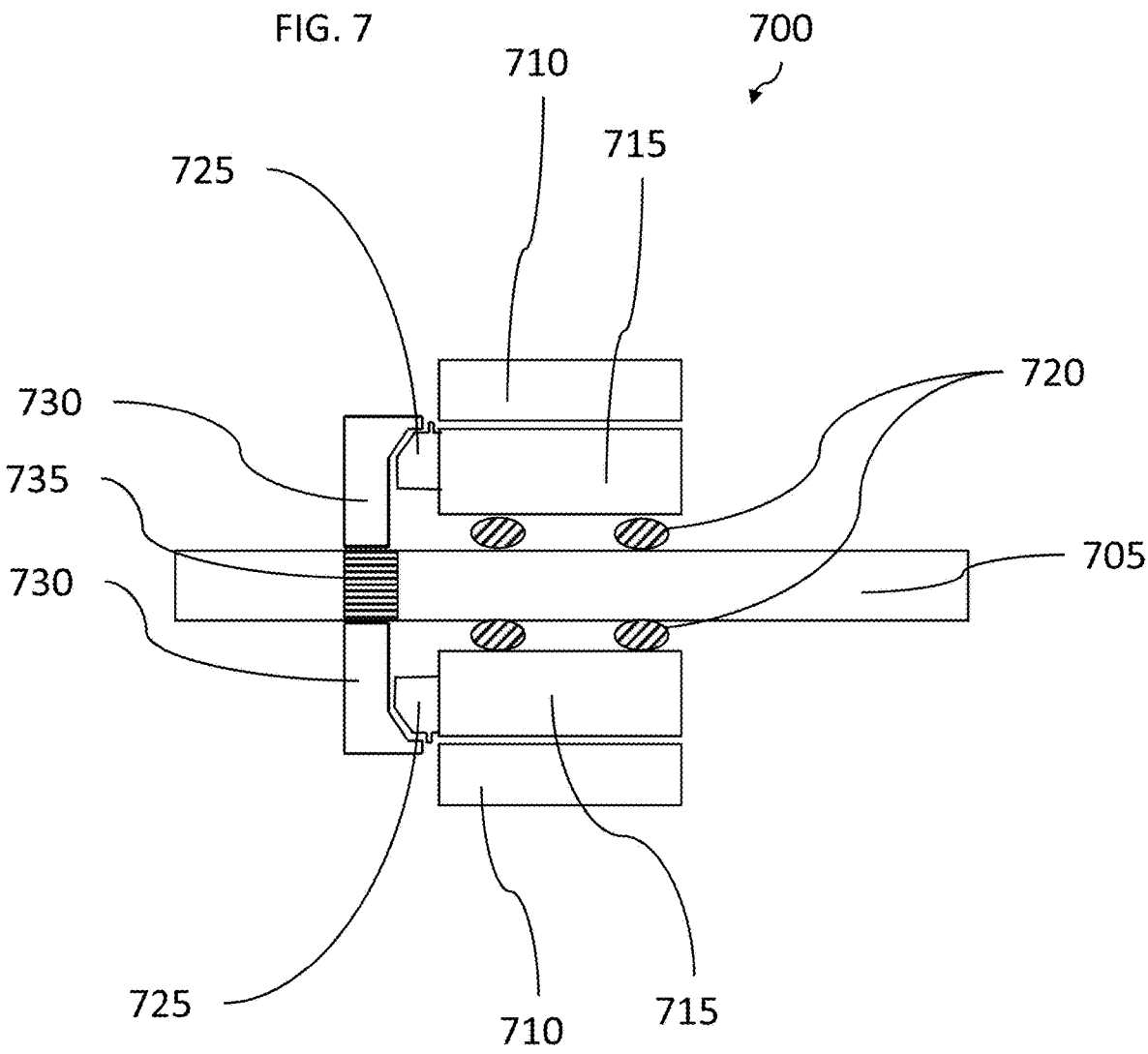
FIG. 7 is a cross-sectional view of an electric machine with a synchromesh transmission configured to engage a rotor of the electric machine with a shaft passing through the electric machine in accordance with various embodiments.
Figure 8:
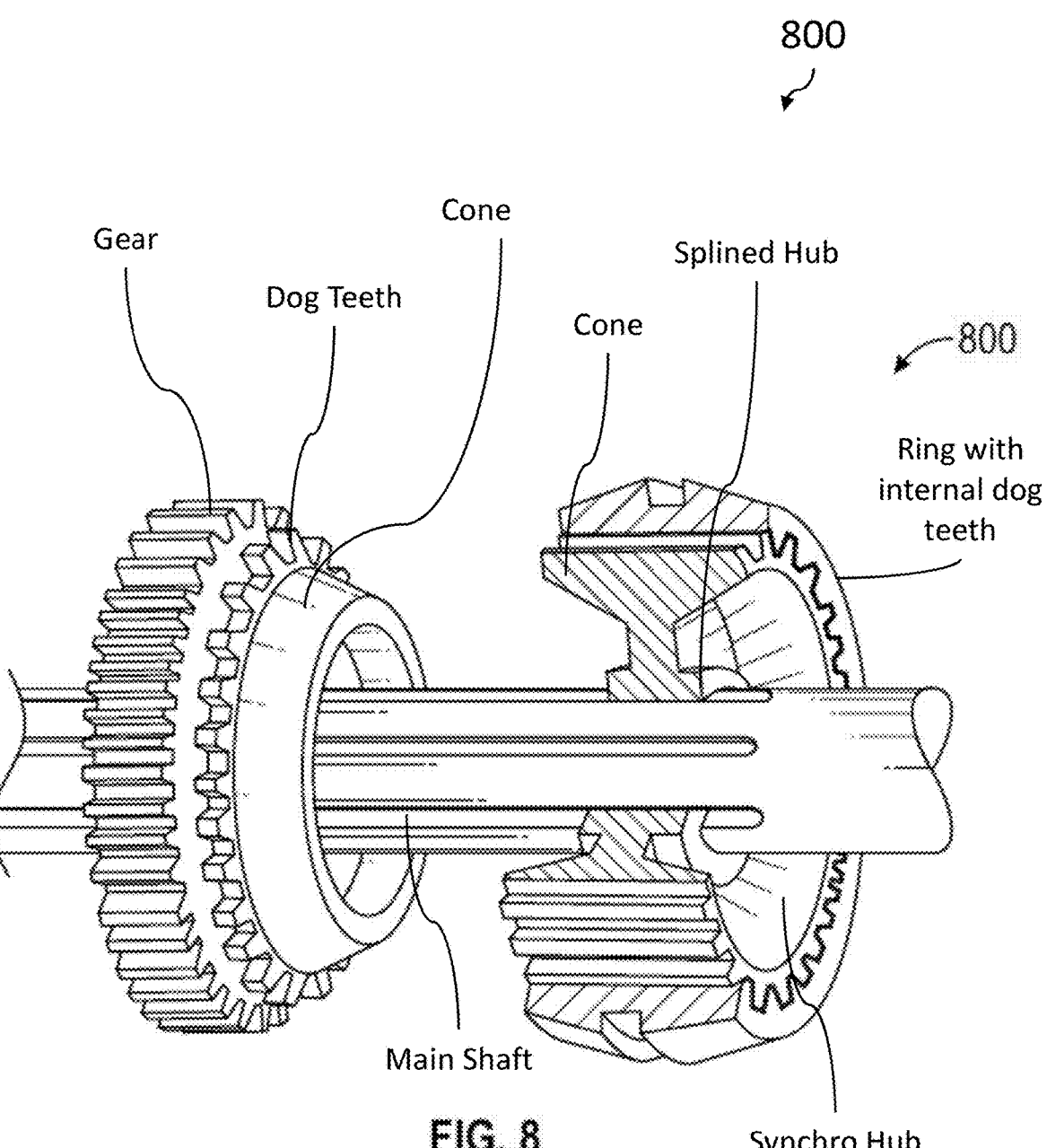
FIG. 8 is a perspective view of an example synchromesh transmission in accordance with various embodiments.

Such an arrangement of a turbine engine, a first emachine (e.g., motor/generator) with a transmission (e.g., synchro and dog ring engagement system and/or clutch as further shown in and described with respect to FIGS. 7 and 8), a planetary gearset, a second emachine connected to a ring gear of the planetary gearset, and a fan with a hub connected to a planet carrier may be employed on an aircraft to provide advantageous performance attributes. This performance may include the ability to engage the system in the mode E plus the synchromesh dog gear engagement for maximum output of electrical power from the first emachine while the fan hub rotational speed is zero or close to zero. In this arrangement the power created by the turbine engine is substantially all converted to electrical power (current). In mode T with dog gear disengaged, the advantageous performance attribute would be the ability to transmit substantially all of the power from the turbine output shaft to the fan hub to drive a bypass fan and create forward thrust to support winged flight. In this mode, it may be particularly advantageous to eliminate any power flow to the motor/generator so that maximum power is available to the fan for maximum possible forward thrust and speed.

Blending of power between modes E and T, such as in a mode B (e.g., blended power desired), and therefore blending of power between electrical generation and mechanical forward thrust, may be particularly advantageous for certain aircraft. For blending to take place, the emachine that is connected to a ring gear (e.g., the emachine 375 connected to the ring gear 360 of FIG. 3B) may be controlled to drive the ring gear at an RPM that is not zero (as with mode E) and not maximum speed (as with mode T) but rather at any intermediate speed as dictated by the control strategy and the state of flight (e.g., based on the desired electrical vs. mechanical power output). With such power blending the aircraft may benefit from some forward thrust while at the same time generating some amount of electrical power less than the maximum available. In this blending mode, the emachine connected to the ring gear may also be operated as a generator, considering that it must apply a resisting torque to the ring gear. The emachine connected to the ring gear may therefore generate some electrical power which may be output (e.g., added to a high-voltage bus of the aircraft) and may be used for aircraft operation, battery charging, aircraft accessories, or any other advantageous use of this generated power. While a particular configuration is shown in FIG. 3B of the sun gear being attached to the turbine output shaft, planet gears being attached to a carrier having the bypass fan, and the ring gear being connected to an emachine, other configurations for use of a planetary gearset or other power splitting devices may also be used.

The configuration in FIG. 3B also shows the emachine 345 being located between the turbine engine 335 and the planetary gearset. However, other configurations may be used in various embodiments. For example, the output shaft 340 may extend out of the other end of the turbine engine 335, and the emachine 345 may be located aft of the turbine engine 335 (e.g., such that the turbine engine 335 is located between the planetary gearset and the emachine 345). In another example, the output shaft 340 may extend out forward of the planetary gearset, and the emachine may be located forward of the planetary gearset (e.g., such that the planetary gearset is located between the first emachine 345 and the turbine engine 335).

Figure 4:
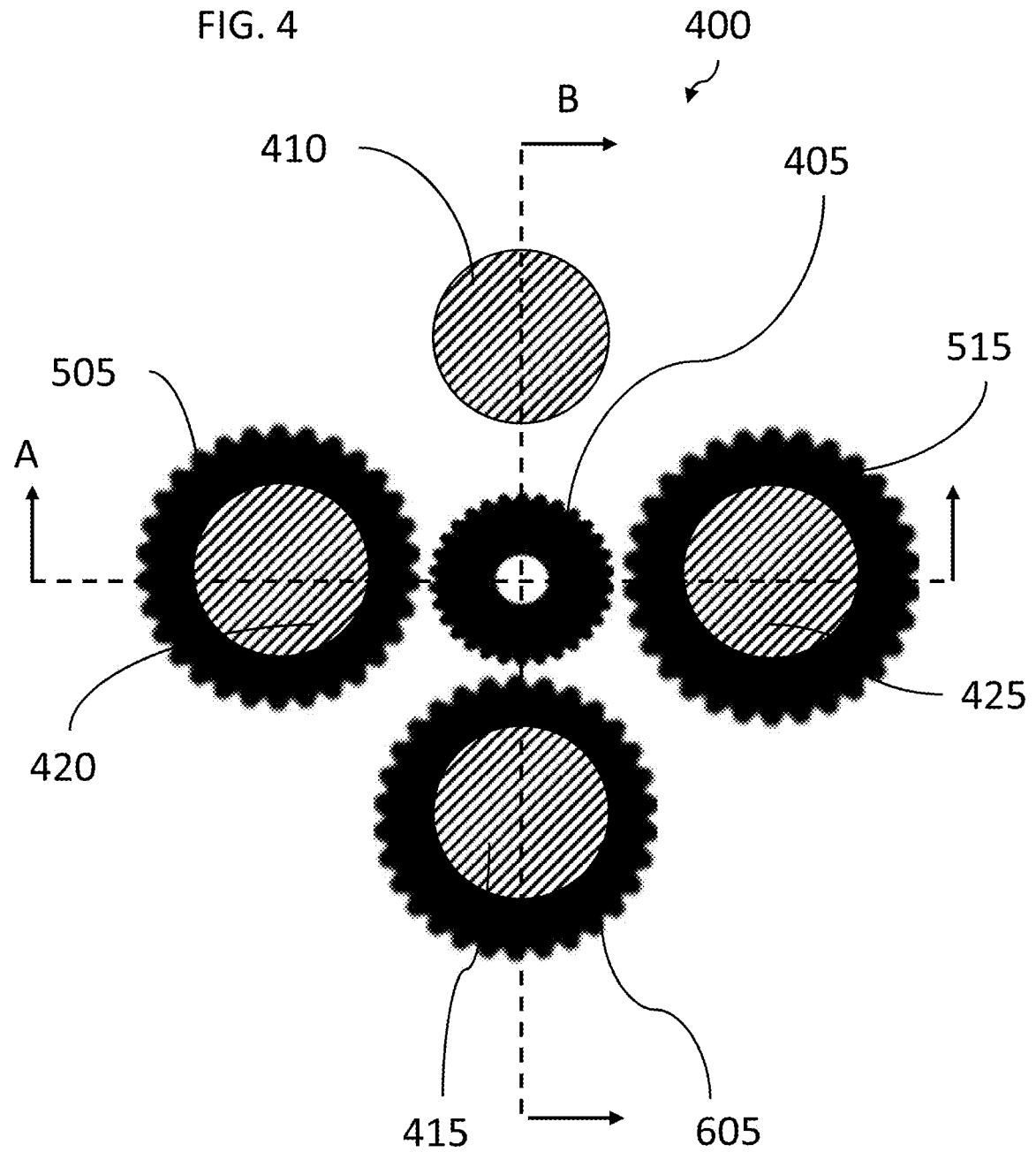
FIG. 4 is a schematic showing an orientation of multiple electric machines being driven by a shaft of a turboshaft engine and another electric machine for driving a ring gear of a planetary gearset in accordance with various embodiments.
Figure 5:
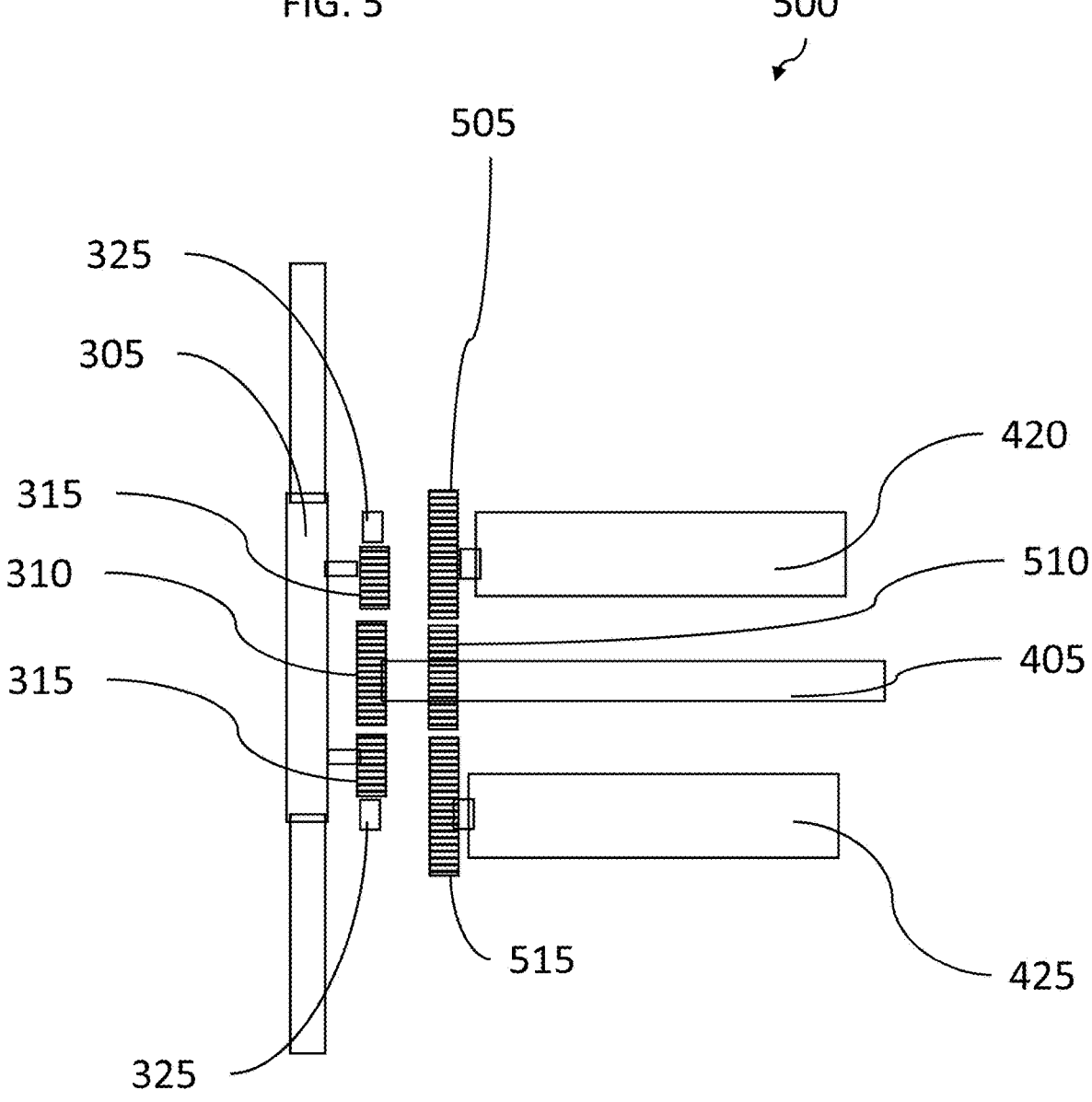
FIG. 5 is a cross-sectional view taken along line A of FIG. 4 showing multiple electric machines being driven by a shaft of a turboshaft engine and a planetary gearset connected to a bypass fan in accordance with various embodiments.
Figure 6:
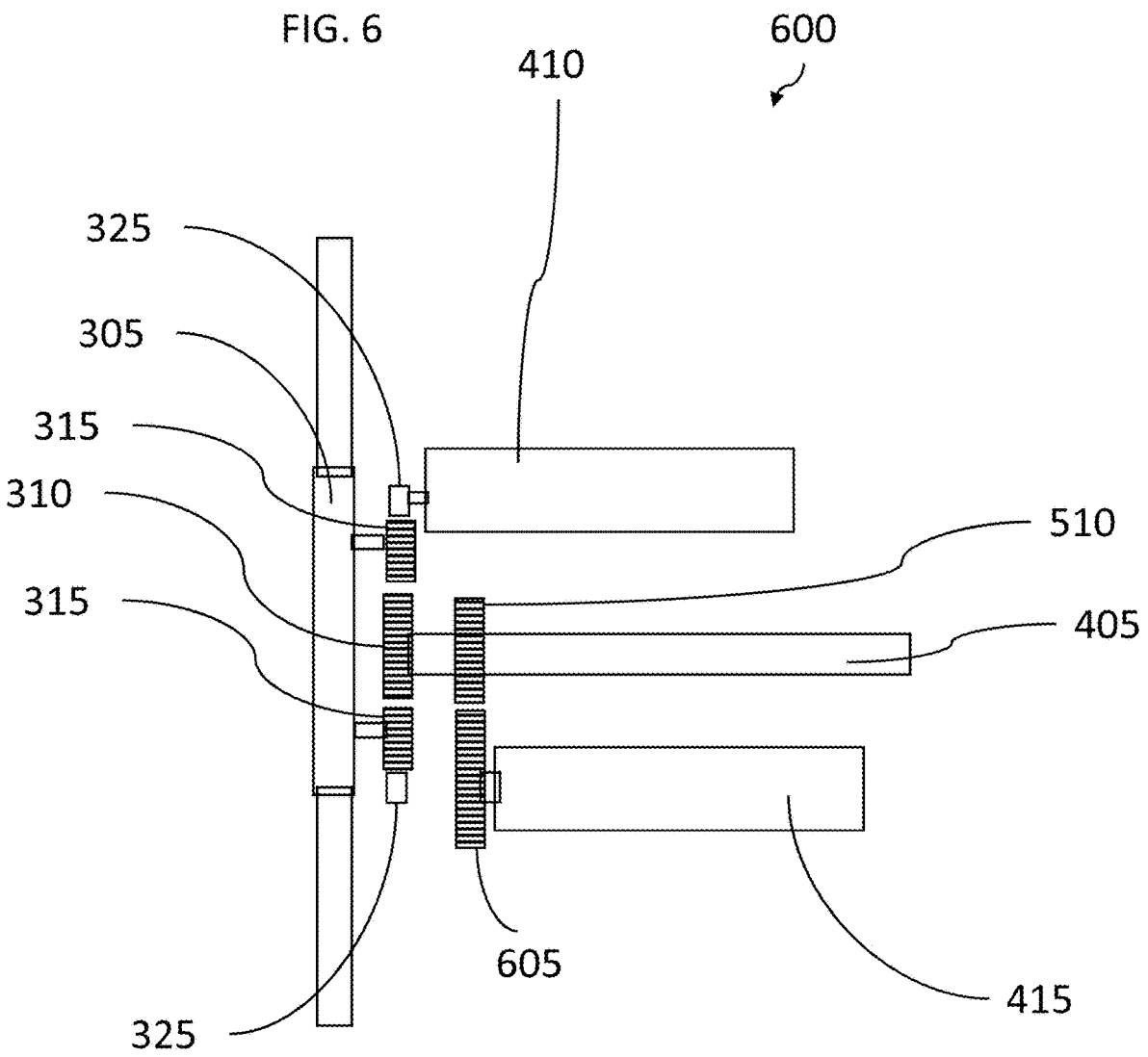
FIG. 6 is a cross-sectional view taken along line B of FIG. 4 showing an electric machine being driven by a shaft of a turboshaft engine, a planetary gearset connected to a bypass fan, and an electric machine for driving a ring gear of the planetary gearset in accordance with various embodiments.

FIG. 4 is a schematic showing an orientation of multiple electric machines 415, 420, 425 being driven by a shaft 405 of a turboshaft engine and another electric machine 410 for driving a ring gear of a planetary gearset in accordance with an illustrative embodiment. FIG. 5 is a cross-sectional view taken along line A of FIG. 4 showing multiple electric machines 420, 425 being driven by the shaft 405 of a turboshaft engine and a planetary gearset connected to a bypass fan 305 in accordance with an illustrative embodiment. FIG. 6 is a cross-sectional view taken along line B of FIG. 4 showing the electric machine 415 being driven by the shaft 405 of a turboshaft engine, a planetary gearset connected to the bypass fan 305, and the electric machine 410 for driving a ring gear 325 of the planetary gearset in accordance with an illustrative embodiment.

More specifically, FIGS. 4-6 show how multiple emachines 415, 420, 425 driven by gears 605, 505, and 515, respectively, may be used instead of a single emachine (as in FIG. 3B) to generate electric power from an output shaft of a turbine engine. In particular, the output shaft 405 of the turbine engine may be used to drive a bevel drive gearset including a gear 510 rigidly connected to or part of the shaft 405, which drives gears 505, 515, 605, which in turn respectively drive a plurality of emachines 415, 420, 425 in an arrangement such as that shown in FIG. 5. This may be particularly advantageous when the available power of the turbine output shaft is higher than the available power rating for an individual emachine generators. For example, the power available at a turbine output shaft may be 1.5 megawatts (MW) while the available emachine power rating may only be 500 kilowatts (KW), for example. In another configuration the total turbine output power may be 5 MW while the rating of each available generator is 1 MW (and five emachines may be used, for example). In various embodiments, different levels of total power output may therefore be achieved, such as anywhere from 250 kW to 30 MW of power from a single turbine engine (multiple powerplants as described herein may also be used on a single aircraft as desired to achieve different levels of power output, deliver mechanical power to multiple propulsion mechanisms of an aircraft, etc.). For example, output of a single powerplant system as described herein may output (in either electrical or mechanical energy) 250 KW, 370 KW, 400 kW, 500 KW, 1 MW, 5 MW, 10 MW, 15 MW, 20 MW, 23 MW, or 30 MW. As such, the amount of electrical output that may be output by a power transmission (e.g., by one or more emachines that are part of a power transmission as described herein) may also output anywhere from 250 KW to 30 MW of power as the electrical output of a power transmission or blended turbofan powerplant as described herein with respect to a single turbine engine (multiple powerplants as described herein may also be used on a single aircraft as desired to achieve different levels of power output, deliver mechanical power to multiple propulsion mechanisms of an aircraft, etc.). For example, output of a single blended turbofan or power transmission system as described herein may output (in either electrical or mechanical energy) 250 kW, 370 KW, 400 kW, 500 kW, 1 MW, 5 MW, 10 MW, 15 MW, 20 MW, 23 MW, or 30 MW. While the maximum capacity output of an engine and therefore the output of an associated power transmission may be at these levels, an engine may not always be operated at maximum capacity or throttle. For example, an engine may be operated at different throttles, which may be represented by a percentage of available power output at maximum throttle. For example, an engine may be throttled at anywhere from 0%-100%. Whenever an engine is not at maximum throttle, the various embodiments herein may still convert whatever power is output by the engine into a mix or blend of mechanical and electrical power. As such, even while an engine is at high levels of throttle (e.g., 50% or above, 60% or above, 70% or above, 80% or above, 90% or above, 95% or above, etc.), all of the power output may be split or blended between mechanical and electrical outputs at various mixed levels as described herein, including where most or all of the power is allocated to only one of the electrical or mechanical outputs. In addition to placing emachines around the power shaft in a planetary type configuration as in FIGS. 4-6, additional emachines may also additionally or alternatively be placed at other locations along the length of the shaft output from a turbine engine. For example, the shaft may have multiple gearings similar to gear 510 so that emachines at different positions along the shaft may receive power from the shaft 405.

One other benefit of an arrangement such as that in FIGS. 4-6 may be that the bevel drive gearset including gears 505, 510, 515, and 605 may be used to change the input RPM compared to the N1 speed providing a more favorable input for the motor/generator device according to the sizing/rating/etc. of the emachines (e.g., in effect reducing or increasing the driven RPM). In other words, the gearing between the shaft 405 and the emachines 415, 420, 425 may also step down or up the RPM from the shaft to input into the emachines 415, 420, 425 as desired. This bevel drive gear arrangement may be used to drive 1, 2, 3, 4, 5, or even more motor/generator units in the same region of a hybrid powerplant. These motor/generators may or may not be identical to each other. They may or may not all be energized with field current at a given time to create motor/generator torque to operate at the same time even if they are all geared directly to create rotation at all times. They may all be selectively disengaged/engaged from their respective bevel gear (e.g., using a synchromesh transmission cone and dog gear arrangement or other suitable connection such as a clutch). For example, it may be advantageous to engage multiple motor/generators in a progressive manner such as one at a time until the full complement of engaged motor/generators is reached. The motor/generators in this arrangement may all be linked directly to their bevel drive gear such that they are engaged by applying field current to a respective stator, or they may all use a synchromesh transmission engagement to limit unwanted power losses when a mode of operation does not call for the use of the motor/generator to consume or create power.

FIG. 5 shows a cross-sectional view taken along line A of FIG. 4, which shows a bevel drive gearset including a gear 510 driving gears 505 and 515 to drive a plurality of electric motor/generators 420 and 425. The gear 510, as well as the sun gear 310 of the planetary gearset, may be machined into the N1 turbine output shaft for example (or into a shaft connected to the N1 turbine output shaft via a clutch, transmission, gearbox, etc. FIG. 5 also shows the planet gears 315, the ring gear 325, and the fan 305.

The various components of a hybrid powerplant system described herein (e.g., any of the components of FIGS. 1-8), including a turbine engine, motor/generator(s), a power blending planetary gearset and associated motor/generator connected to a ring gear, a fan hub/planet carrier, and/or bypass fan may be advantageously arranged inside an engineered duct or nacelle. This arrangement of components and engineered duct may be mounted inside of an aircraft with suitable inlet and outlet flow treatment to support efficient operation. It may also be housed in a nacelle that is designed for mount on an aircraft fuselage, wing, or other suitable location such that the nacelle is in contact with the ambient airstream on the outside surface. In either case, inside mounting or in a nacelle, the airflow may be managed before the bypass fan, through the bypass fan, and downstream to maximize a net forward thrust. Such a nacelle with ducted fan may be optimized for maximum mass flow, pressure rise, or the most advantageous combination of those two factors as it relates to a particular aircraft design and desired propulsion. The planetary gearset further provides flexibility in bypass fan RPM vs. turbine output shaft RPM which allows for maximum adaptation for certain missions or aircraft styles (e.g., the RPM of a bypass fan may be adjusted/customized without changing an output RPM of a turbine engine).

While various specific embodiments for systems and methods that may be used to split or blend power between an electrical power output (e.g., generated by an emachine) and mechanical power output (e.g., thrust via a bypass fan) are described with respect to using a planetary gearset, other configurations, gearsets, clutches, transmissions, or other methods and systems for splitting or blending may be used in various embodiments. In addition, even with a planetary gearset similar to those shown and described herein (e.g., with respect to FIGS. 2-6), other configurations than those described herein may be used in various embodiments. For example, instead of the output shaft of the turbine being connected to a sun gear, a planet carrier being connected to a bypass fan, and a ring gear being connected to an emachine as in FIGS. 2-6, various embodiments may include a bypass fan being connected to a ring gear, an emachine connected to a planet carrier, and an output shaft of the turbine connected to the sun gear. As such, a planetary gearset or any other components for splitting or blending power between mechanical and electrical outputs of a powerplant may be used in various configurations as part of various embodiments to achieve the power splitting/blending functionalities described herein.

For example, the configuration in FIGS. 4-6 shows the emachines 415, 420, and 425 being located between an engine and the planetary gearset. However, other configurations may be used in various embodiments. For example, the output shaft 405 may extend out of the aft end of an engine, and any or all of the emachines 415, 420, and/or 425 may be located aft of the engine (e.g., such that the engine is located between the planetary gearset and one or more of the emachines 415, 420, and/or 425). In another example, the output shaft 405 may extend out forward of the planetary gearset, and any or all of the emachines 415, 420, and/or 425 may be located forward of the planetary gearset (e.g., such that the planetary gearset is located between one or more of the emachines 415, 420, and/or 425 and the engine).

In various embodiments, the planetary gearset or other components that may be used, at least in part, to effect the splitting or blending of power may be referred to as a power transmission. Thus, as in the other embodiments herein, a power transmission may have a power input shaft (e.g., an output of a turbine engine), a first power output shaft (e.g., for output of power to an emachine for generation of electrical power), and a second power output shaft (e.g., for output of mechanical power, for example where the second power output shaft is connected directly or indirectly to a bypass fan). As such, any configuration of power transmission capable of delivering different amounts of power output via at least two different shafts, where at least one shaft is for mechanical power output and at least one shaft is for electrical power output, may be used in various embodiments. In particular, the power output through the different shafts may be some, all, none, or a majority of the total power input from an engine. In this way, both shafts may have substantial (e.g., more than just nominal power, such as to power some low power accessories) power output therethrough. In other words, the power transmission is controllable to vary a percentage of the power from the engine between the first output shaft and the second output shaft such that a majority of the power is selectively provided to either the first output shaft or the second output shaft. Various balances of power output between a mechanical output and electrical output shafts may be achieved such that anywhere from zero to one hundred percent (0%-100%) of the power output by the system may be output to either mechanical output shaft(s) or electrical shaft(s), including as examples any of approximately (with a first number referring to percentage of engine output power being output by a power transmission via one or more mechanical output shafts, and a second number referring to percentage of engine output power being output by the power transmission via one or more electric machines) 100/0, 99.5/0.5, 99/1, 98.5/1.5, 98/2, 97.5/2.5, 97/3, 96.5/3.5, 96/4, 95.5/4.5, 95/5, 94.5/5.5, 94/6, 93.5/6.5, 93/7, 92.5/7.5, 92/8, 91.5/8.5, 91/9, 90.5/9.5, 90/10, 89/11, 88/12, 87/13, 86/14, 85/15, 80/20, 75/25, 70/30, 65/35, 60/40, 55/45, 50/50, 45/55, 40/60, 35/65, 30/70, 25/75, 20/80, 15/85, 14/86, 13/87, 12/88, 11/89, 10/90, 9.5/90.5, 9/91, 8.5/91.5, 8/92, 7.5/92.5, 7/93, 6.5/93.5, 6/94, 5.5/94.5, 5/95, 4.5/95.5, 4/96, 3.5/96.5, 3/97, 2.5/97.5, 2/98, 1.5/98.5, 1/99, 0.5/99.5, or 0/100. In various embodiments, a controller or processor such as that described herein with respect to FIG. 9 may be used to control the percentage mix of power output between mechanical and electrical power as described herein.

FIG. 14 illustrates an example system 1400 with a planetary gearset and two electric machines in accordance with various embodiments. The system 1400 shows an example view of the system 1400 similar to that of FIG. 4, except that only two emachines are shown. The emachine 1410 may be similar to the emachine 410 of FIG. 4 and the shaft 1405 may be similar to the shaft 405 of FIG. 4. Instead of having three emachines that may be driven by the shaft 1405, FIG. 14 shows a single emachine 1415 that may be driven by the shaft 1405 via a gear 1420. As such, the power in the example of the system 1400 may be blended between a mechanical output (e.g., to a bypass fan not shown by way of the shaft 1405 and a planetary gearset not shown) and the emachine 1415. In the example of FIG. 14, the emachine 1415 is located opposite of the emachine 1410. In other words, if the emachine 1410 is located at a zero degree angle position relative to the shaft 1405, the emachine 1415 in FIG. 14 may be located at the 180 degree position. In various embodiments, the emachine 1415 may be located at other positions with respect to the shaft 1405 including anywhere from the zero degree to 360 degree positions, such as any of approximately 0 degrees, 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, 170 degrees, 175 degrees, 180 degrees, 185 degrees, 190 degrees, 195 degrees, 200 degrees, 205 degrees, 210 degrees, 215 degrees, 220 degrees, 225 degrees, 230 degrees, 235 degrees, 240 degrees, 245 degrees, 250 degrees, 255 degrees, 260 degrees, 265 degrees, 270 degrees, 275 degrees, 280 degrees, 285 degrees, 290 degrees, 295 degrees, 300 degrees, 305 degrees, 310 degrees, 315 degrees, 320 degrees, 325 degrees, 330 degrees, 335 degrees, 340 degrees, 345 degrees, 350 degrees, 355 degrees, or 360 degrees. In various embodiments the emachine 1410 may also be placed at different positions relative to the shaft 1405 similar to those describe in the previous sentence with respect to the emachine 1415. In various embodiments, the emachine 1410 and the emachine 1415 may also be placed at different lateral positions along the shaft 1405, such that a cross-sectional plane similar to that of FIG. 14 taken of the system would not intersect with both of the emachines 1410 and 1415. In an embodiment similar to FIG. 14 where there is a single emachine configured to generate electric power from an engine output, the single emachine may have a shaft such as the shaft 1405 pass through it (e.g., similar to the configuration shown in FIG. 7). In such a configuration, the emachine and the shaft may share a same centerline or axis.

FIG. 15 illustrates an example system 1500 with a planetary gearset and three electric machines in accordance with various embodiments. The system 1500 shows an example view of the system 1500 similar to that of FIG. 4, except that only two emachines 1515 and 1525 are shown. The emachines 1515 and 1525 may be similar to the emachines 420 and 425 of FIG. 4, the shaft 1505 may be similar to the shaft 405 of FIG. 4, and the emachine 1510 may be similar to the emachine 410 of FIG. 4. Instead of having three emachines as in FIG. 4 that may be driven by the shaft 1405, FIG. 15 shows two emachines 1515 and 1525 that may be driven by the shaft 1405 via gears 1520 and 1530, respectively. As such, the power in the example of the system 1500 may be blended between a mechanical output (e.g., to a bypass fan not shown by way of the shaft 1505 and a planetary gearset not shown) and the emachines 1515 and 1525. In the example of FIG. 15, the emachines 1515 and 1525 are located opposite of one another. In other words, if the emachine 1410 is located at a zero degree angle position relative to the shaft 1405, the emachine 1515 in FIG. 15 may be located at the 270 degree position and the emachine 1525 in FIG. 15 may be located at the 90 degree position. The emachines 1515 and 1525 may be oriented opposite one another to balance weight in the system 1500. In various embodiments, either of the emachines 1515 and 1525 may be located at other positions with respect to the shaft 1505 including anywhere from the zero degree to 360 degree positions, such as any of approximately 0 degrees, 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, 170 degrees, 175 degrees, 180 degrees, 185 degrees, 190 degrees, 195 degrees, 200 degrees, 205 degrees, 210 degrees, 215 degrees, 220 degrees, 225 degrees, 230 degrees, 235 degrees, 240 degrees, 245 degrees, 250 degrees, 255 degrees, 260 degrees, 265 degrees, 270 degrees, 275 degrees, 280 degrees, 285 degrees, 290 degrees, 295 degrees, 300 degrees, 305 degrees, 310 degrees, 315 degrees, 320 degrees, 325 degrees, 330 degrees, 335 degrees, 340 degrees, 345 degrees, 350 degrees, 355 degrees, or 360 degrees. In various embodiments the emachine 1510 may also be placed at different positions relative to the shaft 1405 similar to those describe in the previous sentence with respect to the emachines 1515 and 1525. In various embodiments, the emachine 1410 and any of the emachines 1515 and 1525 may also be placed at different lateral positions along the shaft 1505, such that a cross-sectional plane similar to that of FIG. 14 taken of the system would not intersect with all of the emachines 1510, 1515, and/or 1525 at once.

FIG. 16 illustrates an example system 1600 with a planetary gearset and five electric machines in accordance with various embodiments. The system 1600 shows an example view of the system 1600 similar to that of FIG. 4, except that four emachines 1620, 1630, 1635, and 1645 are shown. The emachines 1620, 1630, 1635, and 1645 may be similar to any of the emachines 415, 420, and 425 of FIG. 4, the shaft 1605 may be similar to the shaft 405 of FIG. 4, and the emachine 1610 may be similar to the emachine 410 of FIG. 4. Instead of having three emachines as in FIG. 4 that may be driven by the shaft 1405, FIG. 16 shows four emachines 1620, 1630, 1635, and 1645 that may be driven by the shaft 1505 via gears 1615, 1625, 1640, and 1650, respectively. As such, the power in the example of the system 1600 may be blended between a mechanical output (e.g., to a bypass fan not shown by way of the shaft 1605 and a planetary gearset not shown) and the emachines 1615, 1625, 1640, and 1650. In the example of FIG. 16, pairs of the emachines 1615, 1625, 1640, and 1650 are located generally opposite of one another and are generally evenly spaced out. In other words, if the emachine 1610 is located at a zero degree angle position relative to the shaft 1605, the emachine 1620 in FIG. 16 may be located at the 315 degree position, the emachine 1630 in FIG. 16 may be located at the 225 degree position, the emachine 1635 in FIG. 16 may be located at the 135 degree position, and the emachine 1645 in FIG. 16 may be located at the 45 degree position. The emachines 1615, 1625, 1640, and 1650 may be oriented to balance weight in the system 1600. In various embodiments, any of the emachines 1615, 1625, 1640, and 1650 may be located at other positions with respect to the shaft 1605 including anywhere from the zero degree to 360 degree positions, such as any of approximately 0 degrees, 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, 170 degrees, 175 degrees, 180 degrees, 185 degrees, 190 degrees, 195 degrees, 200 degrees, 205 degrees, 210 degrees, 215 degrees, 220 degrees, 225 degrees, 230 degrees, 235 degrees, 240 degrees, 245 degrees, 250 degrees, 255 degrees, 260 degrees, 265 degrees, 270 degrees, 275 degrees, 280 degrees, 285 degrees, 290 degrees, 295 degrees, 300 degrees, 305 degrees, 310 degrees, 315 degrees, 320 degrees, 325 degrees, 330 degrees, 335 degrees, 340 degrees, 345 degrees, 350 degrees, 355 degrees, or 360 degrees. In various embodiments the emachine 1610 may also be placed at different positions relative to the shaft 1605 similar to those describe in the previous sentence with respect to the emachines 1615, 1625, 1640, and 1650. In various embodiments, the emachine 1610 and any of the emachines 1615, 1625, 1640, and 1650 may also be placed at different lateral positions along the shaft 1605, such that a cross-sectional plane similar to that of FIG. 16 taken of the system would not intersect with all of the emachines 1610, 1615, 1625, 1640, and/or 1650 at once.

As discussed above, different numbers of emachines may be used in different embodiments. This may allow for different sizing of emachines to be used depending on the power requirements of an aircraft and/or the power output of an engine in the system. For example, for a given engine output, a larger emachine 1415 may be used in FIG. 14 or 2-4 smaller emachines may be used with the same engine per FIGS. 4, 15, and/or 16, respectively. Similarly, for a given emachine, fewer emachines may be used for an engine with a smaller total output, while more of the same given emachines may be used with larger engines having greater total power output. As such, the various embodiments provide for different tailored embodiments for different power requirements, space constraints, orientations, etc. as desired.

FIG. 7 is a cross-sectional view of system 700 having an electric machine with a synchromesh transmission configured to engage a rotor 715 of the electric machine with a shaft 705 passing through the electric machine in accordance with an illustrative embodiment. FIG. 8 is a perspective view of an example synchromesh transmission 800 in accordance with an illustrative embodiment.

If the design of a given motor/generator (e.g., emachine) is such that eliminating the field current and reducing the net torque to zero is impossible or unfavorable (e.g., significant energy is absorbed by emachine and generated as heat, emachine is damaged over time), a transmission or clutch may be used to limit power consumed by the motor/generator and allowing all or substantially all of the power on a shaft to pass through the emachine to be output to other components of a system (e.g., to planetary gearset for outputting to a bypass fan). In FIG. 7 for example, an arrangement shows that the rotor 715 may be optionally coupled to the turbine output shaft 705, such that the rotor 715 is optionally connected or disconnected through the use of a synchromesh ring and dog gear drive system. The synchro cone and dog gears 730 may be designed to rotate at the same speed as the shaft 705 as they are always driven by the spline 735 on the shaft 705.

In one state of operation, the synchro cone and dog gears 730 are distant from but adjacent to the rotor 715 of the electric motor and therefore there is no transfer of torque or power from the turbine output shaft 705 to the rotor 715. The rotor 715 may be stopped (turning zero RPM) or it may be turning at a very low RPM due to drag friction in the bearings 720 riding on the shaft 705 but close to zero and therefore consuming little to no power. This may be a desirable state, such as when the power of the turbine output shaft 705 is intended for another purpose such as driving a bypass fan.

In a second state of operation, the synchro cone with dog gear arrangement 730 is pressed against the mating cone 725 which is attached to the rotor 715 of the motor by a controllable actuator. The friction between those two cones 730 and 725 causes their RPM to match until a dog gear drive of the synchro cone with dog gear 730 can engage. With the dog gears engaged, any relative motion between the two cones 730 and 725 is stopped, and drive from the turbine output shaft 705 to the rotor is direct, meaning the two cones 730 and 725 may rotate at the same speed (e.g., RPM) and with the ability for the turbine output shaft 705 to provide power to the motor/generator or receive power from the motor/generator. This is desirable if the intended power flow involves the output power from the turbine output shaft 705 being transferred to the motor/generator as the generator creates electrical power for use on the aircraft as the rotor 715 rotates with respect to the stator 710 of the emachine. A specific example of a synchromesh transmission 800 that may be used is shown in FIG. 8.

FIGS. 7 and 8 show an example method of engaging and disengaging a rotor of an emachine from a shaft such as a turbine output shaft. Other components and methods of engaging and disengaging a rotor of an emachine from a shaft (e.g., a clutch or simple dog gear with no synchronizer cones) may be additionally or alternatively used in various embodiments. In addition, the methods and systems of engaging or disengaging a rotor of a generator to a shaft may be used for any emachine described according to the embodiments herein. For example, in FIGS. 4-6, some or all of the emachines 410, 415, 420, and/or 425 may have a transmission or clutch for engaging or disengaging each emachine from its respective shaft that passes therethrough.

A transmission or power transmission as used herein may further be used to mean any components that receive power via a first shaft from an engine and split that power between a mechanical power output at a second shaft and an electrical power output. For example, any of the gearsets, clutches, emachines, locking mechanisms, shafts etc. may be assembled or packaged as a transmission that receives mechanical power from an engine and outputs mechanical power, electrical power, or a combination of the two as desired. For example, 2A-2D, 3A, 3B, 4-8, 12, and 14-16 show components that may be part of a power transmission as described herein to blend or adjust power output between mechanical and electrical output, including such components as shafts, clutches, locking mechanisms, emachines, etc. In addition, as described herein, such a power transmission may also receive electrical power (e.g., from a battery pack) and use that power to further output additional mechanical power.

FIG. 9 illustrates a block diagram 900 representative of an aircraft control system for use with a hybrid powerplant having a turboshaft engine and a planetary gearset in accordance with an illustrative embodiment. The aircraft control system 900 may be used, for example, to implement one or more of the various modes of operation of a hybrid powerplant discussed herein. Engine 920 of the system 900 may be the same as or similar to any of the turbine engines (e.g., turboshafts, turbofans, etc.) described herein. The bypass fan 945 may be the same as or similar to any of the bypass fans described herein. The first generator/motor 925 may be the same as or similar to any of the emachines described herein that are powered from a shaft of the turbine engine 920. The second generator/motor 930 may be the same as or similar to any of the emachines described herein that are used to control and/or power a ring gear of a planetary gear set. The synchromesh transmission 935 may be the same as or similar to any of the synchromesh transmissions described herein, or may be a different type of clutch or transmission as described herein.

The aircraft control system 900 may further include one or more processors or controllers 905 (hereinafter referred to as the controller 905), memory 910, an electrical power I/O 940, accessories 945, one or more sensor(s) 915, one or more propulsion mechanism(s) 950, and an electric power source such as batteries 955. The connections in FIG. 9 indicate control signal related connections between components of the aircraft control system 900. Other types of connections not shown in FIG. 9 may exist between different aspects of the aircraft and/or aircraft control system 900 for providing electrical power, such as a high voltage (HV) or low voltage (LV) power for an aircraft. The electrical power I/O 940 may be the physical connections of the generator/ motor 925 to one or more busses or wiring of an aircraft, so that power may be distributed throughout the aircraft. The electrical power I/O 940 may also be or may include sensors such as voltage or current sensors configured to measure aspects of the power flowing into or out of the generator/ motor 925 and/or generator motor 930. Thus, the controller 905 may be configured to monitor and/or control the power going into or out of the generator/motor 925 and/or generator motor 930.

The memory 910 may be a computer readable media configured for instructions to be stored thereon. Such instructions may be computer executable code that is executed by the controller 905 to implement the various methods and systems described herein, including the various modes of using the hybrid powerplants described herein, as well as combinations or particular sequences of those modes. The computer code may be written such that the various methods of implementing different modes of the hybrid powerplants herein are automatically implemented based on various inputs that indicate, for example, a particular flight phase (e.g., landing, takeoff, cruising, etc.) or particular sensor conditions (e.g., altitude, temperature, air pressure, fuel level, condition of operation of various components on board an aircraft, etc.). In various embodiments, the computer code may be written to implement the various modes herein based on input from a user or pilot of the aircraft or aerospace vehicle, or may be implemented based on a combination of user input and automatic implementation based on non-human inputs (e.g., from sensors on or off the aircraft, based on planned flight plans, etc.). The controller 905 may be powered by a power source on the aircraft or aerospace vehicle, such as the generator/motor 925 and/or generator motor 930, one or more batteries 955, the electrical power I/O 940, a power bus of the aircraft powered by any power source, and/or any other power source available.

The controller 905 may also be in communication with each of components in FIG. 9. In this way, the components of hybrid powerplants as described herein may be controlled, including to implement various modes as described herein.

The sensor(s) 925 may include various sensors for monitoring the different components of a hybrid powerplant. Such sensors may include temperature sensors, tachometers, fluid pressure sensors, voltage sensors, current sensors, state sensors to determine, for example, a current state of synchromesh transmission 935, a current state of any gear boxes, or any other type of sensor. For example, voltage and/or current sensors may be used to inform function and settings of a motor/generator, a state chosen for the synchromesh transmission 935, or for adjusting any other component of a system. A state sensor could also indicate a specific mode the hybrid powerplant is being used in, and the system may receive inputs (e.g., from a pilot, from an automated flight controller), to change the system to a different state or mode for a certain phase of flight that may be upcoming. Other sensors may include a pitot tube for measuring aircraft airspeed, an altimeter for measuring aircraft altitude, and/or a global positioning system (GPS) or similar geographic location sensor for determining a location relative to the ground and/or known/mapped structures.

In various embodiments, the controller 905 may also be in communication with one or more batteries or battery management systems to monitor their charge levels, control when the batteries are charged or discharged, control when the batteries are used to power the generator/motor 925, control when the batteries are used to directly power another aspect of the aircraft, etc.

In some embodiments, the controller 905 may be in communication with devices hardwired to the controller 905 on-board an aircraft, and/or may be in communication with a wireless transceiver that may be on-board an aircraft or aerospace vehicle, so that the controller 905 may communicate with other computing devices not hard-wire connected to the system 900. In this way, instructions or inputs for implementing the various modes for the flexible architectures described herein may also be received from a remote device computing device wirelessly. In other embodiments, the system 900 may only communicate with components on-board the aircraft.

The controller 905 may also send signals to change a state of the synchromesh transmission 935, for example, to engage or disengage a given generator/motor to its respective shaft. The controller 905 may also control the generator/ motors 925, 930 and/or the turbine engine 920 so that a desired output of electricity from the generator/motors 925, 930 and/or a desired mechanical output to the bypass fan 945 is achieved as discussed herein.

Figure 13:
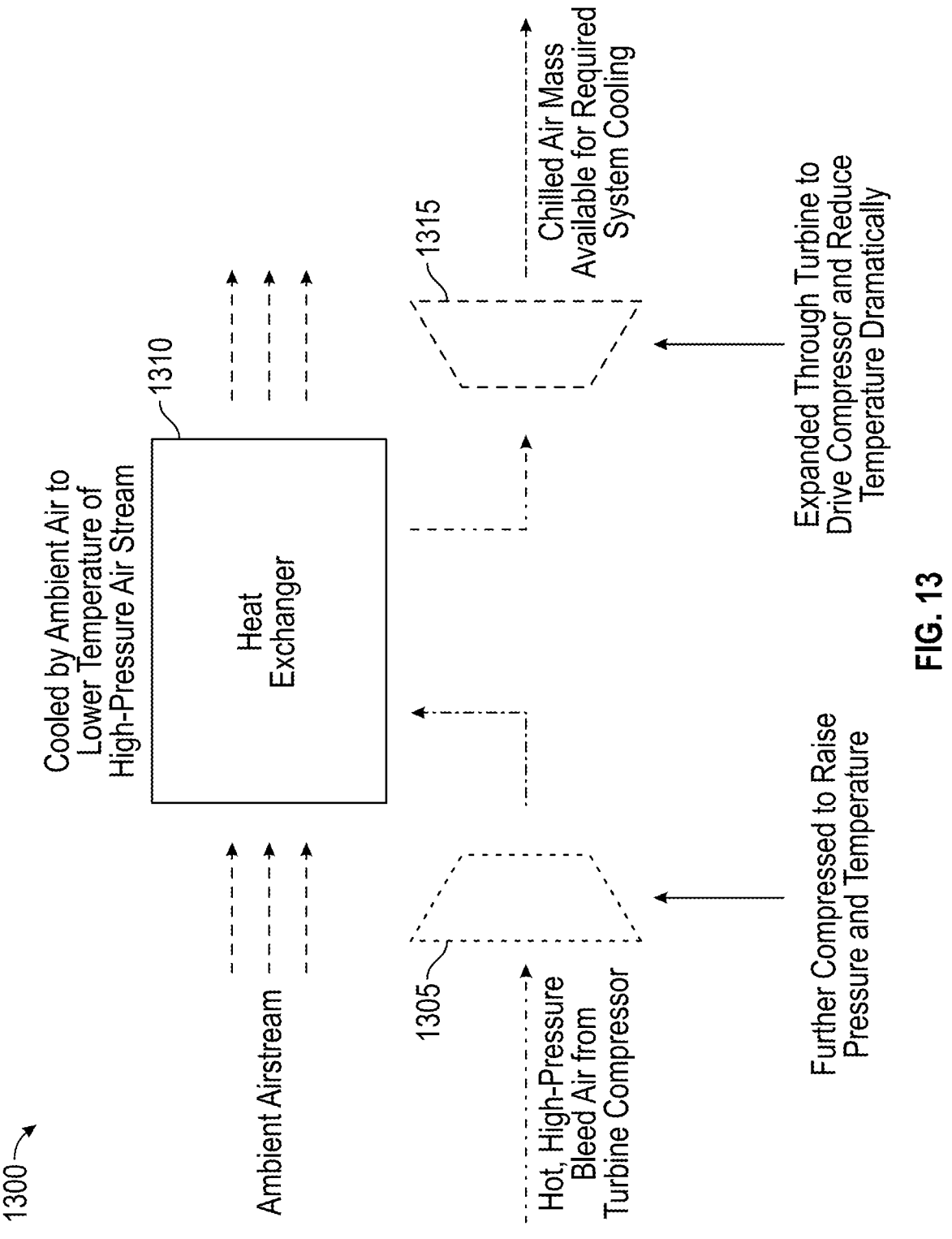
FIG. 13 is a schematic showing an air cycle for cooling of mechanical components of an aircraft in accordance with various embodiments.

The controller 905 may also send signals to monitor and/or control a cooling system 960 or various aspects of a cooling system 960, such as that shown in and described with respect to FIG. 13 herein.

Described further below are different specific modes that may be implemented using various embodiments of the hybrid powerplants described herein. FIG. 10 specifically shows a flow chart 1000 illustrating a use of a hybrid powerplant having a turboshaft engine and a planetary gearset engine core in accordance with an illustrative embodiment.

In a first mode at 1002, maximum or near maximum power output from a turbine engine may be directed to an emachine to generate electrical power output. Thus, such a mode may produce little or zero forward thrust as desired. Such a mode may be valuable, for example, during a vertical takeoff and/or landing operation of a VTOL aircraft. As such, at 1002, gearing may be controlled with a second emachine(s) and a turbine engine output to direct power primarily or wholly to a first emachine(s) to maximize electrical power output for a vertical takeoff of an aircraft. In order to generate power using the first emachine(s), a field current of each of the first emachine(s) may also be changed or adjusted so that, rather than spinning freely and letting power pass to the planetary gearset, each of the first emachine(s) generate power.

In a second mode at 1004, some combination of forward thrust and electrical power generation may be desired. For example, such a mode may be used during transition from forward flight to a vertical takeoff and/or landing operation (which may be powered by electric power), for example. This mode may also be employed when the pilot (e.g., human or autonomous) desires to sacrifice maximum speed capability (and therefore lower forward thrust) to generate high electrical power for other uses on the airplane, such as high-power accessories. This mode of operation may also be used/desirable where it is desirable to maintain a minimum airflow through a core thermal engine of a turbofan even if no forward thrust is desired. In other words, through rotation of the bypass fan, air may still be passed through a turbine engine as desired without drawing an excessive amount of power to do so, allowing significant power to still be generated by an emachine. As such, at 1004, gearing is controlled with the second emachine(s) and the turbine engine to direct power to a combination of the bypass fan and the first emachine(s) during a transition of an aircraft or during use of high-power accessories.

In a third mode at 1006, the power generated by a LP turbine and output by an output shaft of a hybrid powerplant may be transmitted wholly or primarily to the bypass fan to create only or primarily forward thrust. Maximum thrust may be desired, for example, during cruising of an aircraft (e.g., between takeoff and landing). As such, in this mode, the aircraft may minimize other power draw from the shaft (e.g., by the emachine) so that an aircraft may achieve its maximum or near-maximum speed. In other words, at 1006, gearing may be controlled with the second emachine(s) and turbine engine to direct power primarily or wholly to the bypass fan to maximize forward thrust during cruising/horizontal flight of an aircraft.

At 1008, the second mode may be implemented again to transition the aircraft back to a vertical flight mode or during use of high-power accessories. In the case of transitioning the aircraft, this may be to prepare the aircraft for implementing a vertical flight mode so that the aircraft can hover, land, etc. At 1010, the first mode is implemented again so that the aircraft may complete a vertical landing, hover, or otherwise implement a vertical flight mode.

A further fourth mode, not shown in FIG. 10, may be used where some forward thrust may be desired from the bypass fan of the turbofan without starting or operating its core thermal engine (e.g., the turbine engine). This may be accomplished by driving the motor/generator as an electric motor using onboard energy storage (e.g., such as from a battery or multiple batteries). Such operation may be for short bursts of power to the bypass fan, or for an added dimension of safety and survivability should the core thermal engine fail. To implement such an operation, an output shaft of the emachine may be coupled to, directly or indirectly, the shaft of the bypass fan so that the bypass fan may actually be driven by the output of the emachine. For example, as described herein, the shaft of an emachine may be permanently connected to the output shaft of the turbine engine so that the bypass fan may be further driven by the emachine, or the shaft of an emachine may be connectable to the turbine engine shaft by way of a clutch, transmission, or similar, so that the emachine may be selectively connected to the main turbine output shaft to assist in driving the bypass fan to produce thrust.

As such, using the method 1000, a VTOL aircraft may implement all stages of a desired flight, including vertical takeoff (1002), transition from vertical to horizontal flight (1004), horizontal/cruising flight (1006), transition from horizontal to vertical flight (1008), and vertical landing (1010).

Figure 11:
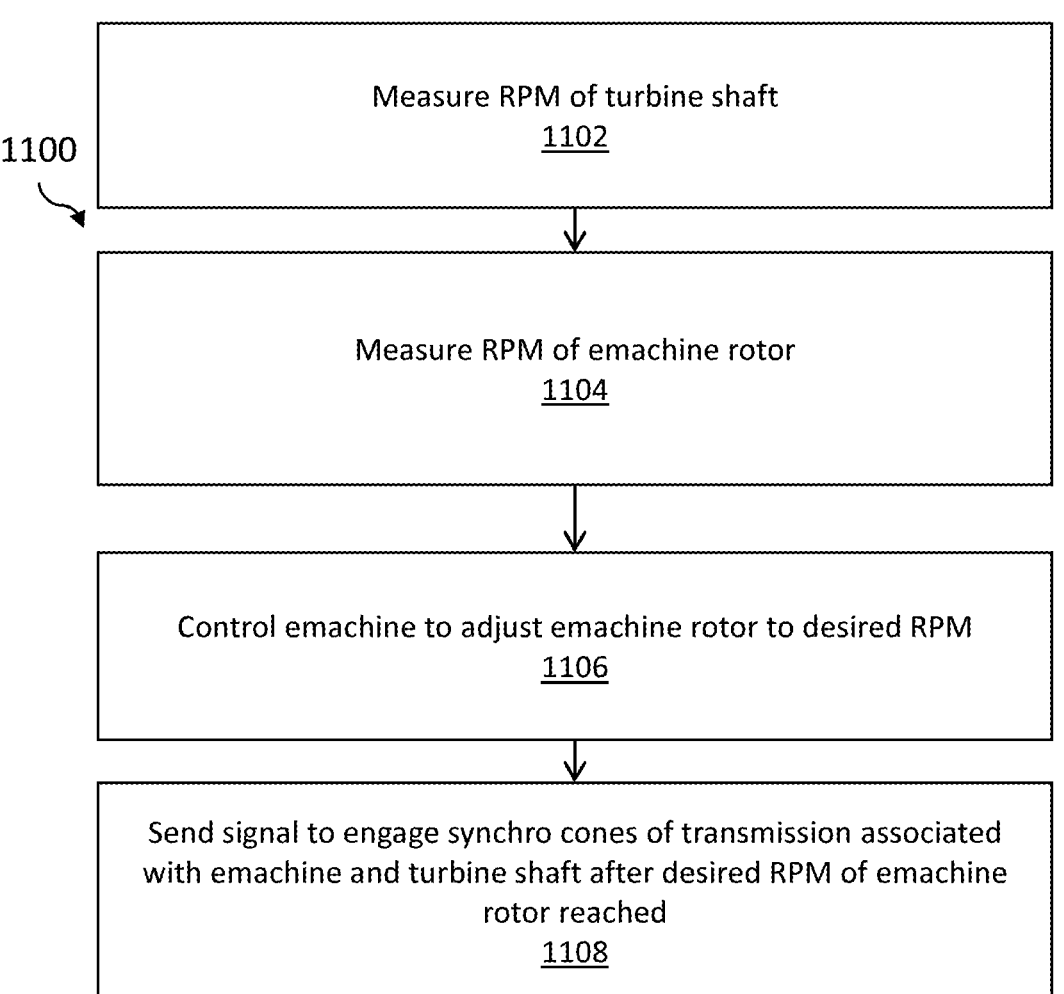
FIG. 11 is a flow chart illustrating use of a transmission to engage a shaft with a rotor of an electric motor/generator in accordance with an illustrative embodiment.

In various embodiments where a transmission such as a synchromesh transmission is used, it may be desirable to sense (e.g., with a sensor and/or controller) the RPMs of turbine shaft and rotor of an emachine (or a shaft connected thereto). In this way, the difference in RPM between the turbine shaft and the emachine rotor may be determined. If the RPM of the turbine output shaft is high (e.g., 29,000 RPM), and the initial RPM of a rotor of an emachine is low when not being actively driven, such as close to zero, power transmitted by and heat generated in a transmission (e.g., at the synchro cones of a synchromesh transmission) may be excessive if used to match the RPM between such a high and low amount could be excessive leading to premature wear and/or failure. To limit this effect, the motor/generator may be driven in motor mode using high voltage energy stored elsewhere in the system to increase the rotor RPM to a target value which is close to the N1 speed of the turbine output shaft before the synchro cone and dog gear arrangement are engaged (e.g., by sending a control signal to the transmission from a controller). In this way, RPM matching of synchro cones may include adjustment of relative rotational speeds between a turbine shaft and emachine rotor before the dog gears are engaged, such that less power is required to be absorbed by the synchro cones upon engagement of the cones, leading to heat generation and energy loss to be minimized. FIG. 11 is a flow chart 1100 illustrating such a use of a transmission to engage a shaft with a rotor of an electric motor/generator in accordance with an illustrative embodiment.

At 1102, an RPM of the turbine shaft is measured. At 1104, the RPM of the emachine rotor is measured. At 1106, the emachine is controlled such that the RPM of the rotor is adjusted to a desired RPM, such as the RPM of the turbine shaft or something close to it. Once the controller determines that the RPM of the emachine rotor has reached the desired RPM, the controller may send a control signal to the transmission to engage the emachine and the turbine shaft. In various embodiments, a similar method may be implemented for an emachine connected to a ring gear of a planetary gearset. For example, the RPM of a shaft connected to a gear receiving rotation from the ring gear as well as a rotor of the emachine may be measured, and the emachine may be controlled to get an RPM of the rotor close to or matching the shaft from the gearset so that the transmission may engage the shaft and rotor of the emachine. In another alternative embodiment, where the emachine is already attached to a ring gear using a gear as in FIG. 3B, the ring gear and gear connected to the ring gear may be engaged or disengaged to decouple or couple the emachine to the ring gear.

Figure 12:
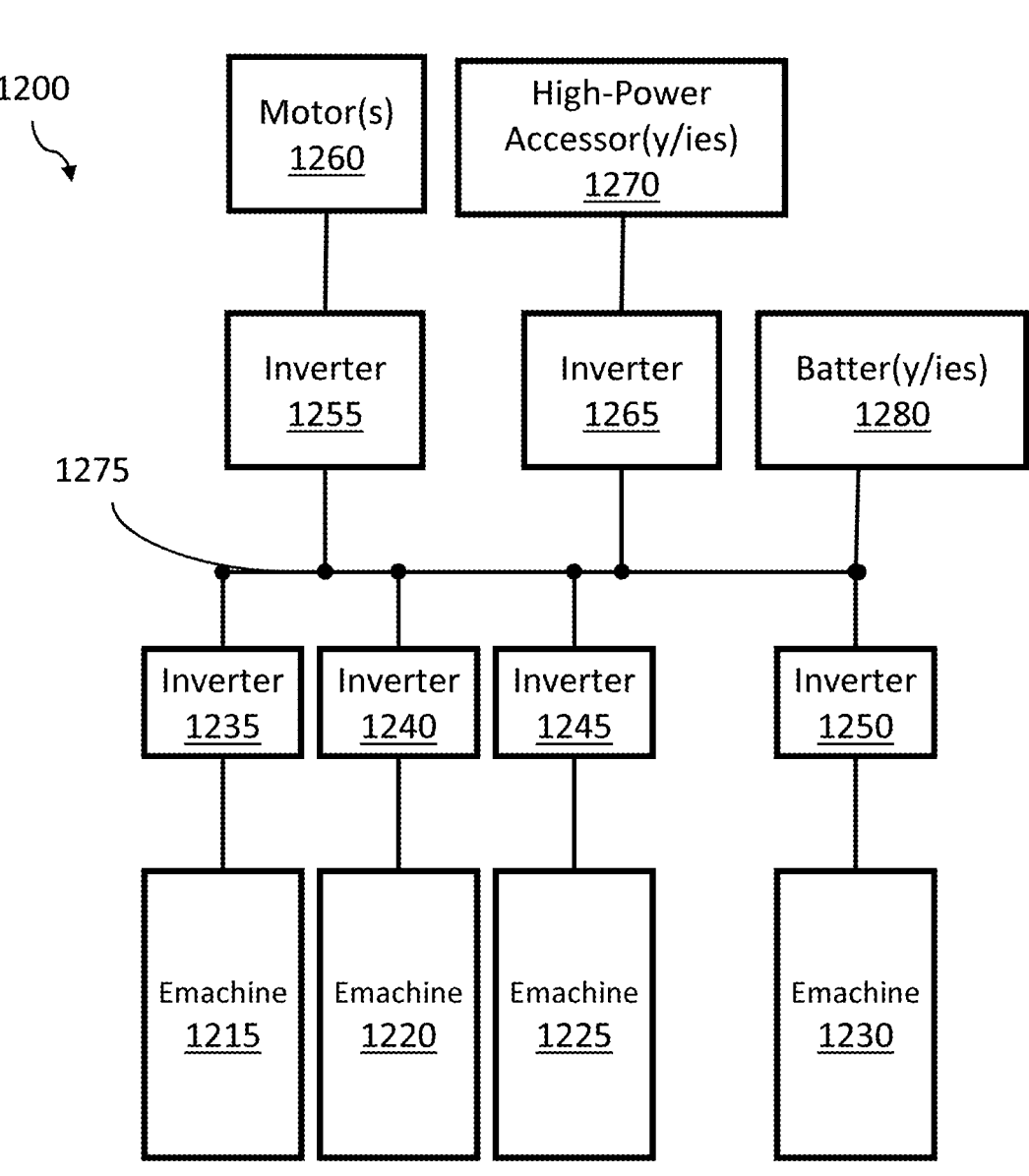
FIG. 12 is a schematic illustrating a system having multiple electric motor/generators in accordance with various embodiments.

FIG. 12 is a schematic illustrating a system having multiple electric motor/generators 1215, 1220, 1225, 1230 in accordance with an illustrative embodiment. The motor/generator(s) 1215, 1220, 1225 may be primarily used for power generation (e.g., may be similar to or may be the emachines 415, 420, 425 of FIGS. 4-6) may be connected to respective inverters 1235, 1240, 1245 to convert AC power to DC power, and output that DC power to a DC bus 1275. The inverters 1235, 1240, 1245 may also serve the function of motor controllers. As the total power generated rises above about 1 MW, such a system may involve multiple inverters, and each emachine may also have multiple inverters on each motor/generator in a system with multiple motor/generators. If these multiple inverters are mounted near the motor/generators that may have an advantage of limited electromagnetic interference. The emachines may also be placed in a way to limit any blocking or otherwise displacing airflow from a bypass fan and thereby limiting net thrust produced. In various embodiments, the inverters may also be arranged in a nacelle around an outside of a bypass fan duct. This may have advantages for overall airflow efficiency, arranging an efficient high voltage bus (e.g., the DC bus 1275), and may provide advantages for efficiently cooling the components described herein.

The emachine 1230 may be the emachine connected to a ring gear, and may also have an inverter 1250 to convert power from DC to AC for use by the emachine 1230 or for conversion of power generated by the emachine 1230 from AC to DC for output to the DC bus 1275. A battery or battery pack/module 1280 (or any other type of electrical energy storage) may also be connected to the DC bus 1275. Components on the aircraft that consume electricity, such as vertical flight motors 1260 and/or high-power accessories 1270 may be connected to the DC bus via their own inverters 1255 and 1265, so that AC power may also be supplied to those components. In various embodiments, components that use DC power may be connected directly to the DC bus without use of an inverter. In various embodiments, an AC bus may be used instead of or in addition to a DC bus. In such embodiments, AC power output by various emachines may be supplied to various aspects of the aircraft without using an inverter to change it to DC power. An inverter may then be used with a battery or other DC power source to output AC power to an AC bus. The various components of FIG. 12 may be controlled, sensed, monitored, etc. by a computing device. For example, the processor(s)/controller(s) 905, alone or in combination with other devices, may be used to control, sense, monitor, etc. the various aspects shown in FIG. 12.

FIG. 13 is a schematic showing an air cycle for cooling of mechanical components of an aircraft in accordance with an illustrative embodiment. For any emachines in the various embodiments herein (e.g., emachines that are converting turbine output power to electrical power for an aircraft and/or for an emachine that helps to create a power blending capability by controlling the rotation of a ring gear or other gear of a planetary gearset), there may be electronic losses that manifest in the form of waste heat. If heat builds up around an emachine or in other components near the emachines, the emachines or other components may suffer from degraded performance and/or damage, which may even lead to a failure. As such, it may be desirable to remove excess heat from the emachines and/or surrounding components. To cool the emachines and surrounding components, such as each emachine's respective inverter, cold air from the air cycle shown in FIG. 13 may be directed toward the emachines and/or their inverters to cool them. For example, in FIG. 13, hot air from a turbine compressor (e.g., the turbine engine of FIGS. 1, 2A-2D, 3B, 9, etc.) may be input into a compressor 1305 of an air cooling system 1300. That air may be compressed at the compressor 1305 to have even higher pressure and temperature, and then may be input into heat exchanger 1310. Ambient air may be passed through the heat exchanger 1310 so that the high temperature, high pressure air from the compressor 1305 becomes a high pressure, lower temperature air stream that is passed to a turbine 1315 of the air cooling system 1300. That chilled air may be used to cool any of the components described herein, including any of the components of a blended turbofan or parallel hybrid turbofan as described herein, such as emachines, electric motors, inverters, battery or energy storage systems, accessories including high-power accessories, etc. Some of the cool air expanded at the turbine 1315 may also be used to cool a cabin of an aircraft. The compressor 1305 and/or the turbine 1315 of FIG. 13 may be separate from the compressor and turbine stages of a turbine engine used in a blended turbofan or parallel hybrid turbofan as described herein, or the compressor 1305 and/or the turbine 1315 of FIG. 13 may be part of or be stages of a turbine engine used a blended turbofan or parallel hybrid turbofan in accordance with various embodiments described herein. As such, components already in a turbine engine of the various embodiments herein may be used, in part, to cool other components of a blended turbofan or parallel hybrid turbofan as described herein.

At least some aspects of the present disclosure will now be described with reference to the following numbered clauses.

1. An aircraft powerplant comprising:
an engine having an output power shaft;
a power transmission coupled to the output power shaft of the engine, wherein the power transmission is configured to divide power output of the engine between a mechanical power output and an electrical power output, wherein a majority of the power output from the engine is adjustable to output to either of the mechanical power output or the electrical power output;
a propulsion mechanism coupled to the mechanical power output; and
a control system configured to cause the power transmission to:
deliver the majority of the power output of the engine to the propulsion mechanism to generate thrust or
deliver the majority of the power output of the engine as electrical power output via the electrical power output.

2. The aircraft powerplant of clause 1, wherein the control system is configured to cause the power transmission to selectively divide the power output of the engine between the electrical power output and the mechanical power output such that each of the electrical power output and the mechanical power output receive between 20%-80% of a total power output of the engine, wherein the total power output of the engine represents 100%.

3. The aircraft powerplant of clause 1, wherein while the engine is operating at more than 70% capacity, the power transmission delivers at least 90% of the output power of the engine to the electrical power output and less than 10% of the output power of the engine to the propulsion mechanism.

4. The aircraft powerplant of clause 1, wherein the engine comprises a turbine engine, a piston engine, or a rotary engine.

5. The aircraft powerplant of clause 1, wherein the electrical power generated by the electric machine at the electrical power output is at least 250 kilowatts (KW) of maximum power, at least 370 kW of maximum power, at least 500 kW of maximum power, or at least 1 megawatt (MW) of maximum power.

6. The aircraft powerplant of clause 1, wherein the propulsion mechanism comprises a bypass fan or ducted bypass fan.

7. The aircraft powerplant of clause 1, wherein the propulsion mechanism comprises a propeller.

8. The aircraft powerplant of clause 1, wherein the power transmission comprises an electric machine configured to generate electrical power based on the power output from the engine allocated to the electric machine.

9. The aircraft powerplant of clause 6, wherein the electric machine is configured to provide electrical power to the electrical power output, wherein the electrical power is used to drive an electric motor configured to generate thrust for an aircraft.

10. The aircraft powerplant of clause 7, wherein the propulsion mechanism is configured to generate forward thrust for the aircraft, the propulsion mechanism is configured to generate the forward thrust for a horizontal flight mode of the aircraft, and the electric motor is configured to generate the vertical thrust for a vertical flight mode of the aircraft.

11. The aircraft powerplant of clause 1, wherein the power transmission is configured to adjust the split of power output from the engine such that:

at least 95% of the power output from the engine is output to the mechanical power output while 5% or less of the power output from the engine is output to the electrical power output; and at least 95% of the power output from the engine is output to the electrical power output while 5% or less of the power output from the engine is output to the mechanical power output.

12. The aircraft powerplant of clause 1, wherein the power transmission is configured to adjust the split of power output from the engine such that:

at least 98% of the power output from the engine is output to the mechanical power output while 2% or less of the power output from the engine is output to the electrical power output; and at least 98% of the power output from the engine is output to the electrical power output while 2% or less of the power output from the engine is output to the mechanical power output.

13. The aircraft powerplant of clause 1, wherein the engine and the power transmission are mounted within a nacelle housing of an aircraft.

14. The aircraft powerplant of clause 1, wherein the electrical power output is configured to output power at a nominal voltage of 400V, 800V, 1000V 1200V, 1500V, 2.4 kV, or 3 kV.

15. The aircraft powerplant of clause 12, wherein the power transmission comprises an electric machine, and further wherein the electric machine is configured to output power at the nominal voltage by way of a voltage conversion device.

16. The aircraft powerplant of clause 1, wherein the power transmission comprises a planetary gearset comprising:

a sun gear coupled to the output power shaft;

a planet carrier coupled to an electric machine or the mechanical power output; and a ring gear coupled to the electric machine or the mechanical power output, wherein an output of the electric machine is coupled to the electrical power output.

17. An aircraft powerplant comprising:

a turbine engine having an output power shaft;

a power transmission coupled to the output power shaft of the turbine engine, wherein the power transmission is configured to divide power output of the engine between a mechanical power output and an electrical power output, wherein a majority of the power output from the turbine engine is adjustable to output to either of the mechanical power output or the electrical power output;

a propulsion mechanism coupled to the mechanical power output; and a control system configured to cause the power transmission to:

deliver the majority of the power output of the turbine engine to the propulsion mechanism to generate thrust or deliver the majority of the power output of the turbine engine as electrical power output via the electrical power output.

18. The aircraft powerplant of clause 17, wherein the control system is configured to cause the power transmission to selectively divide the power output of the turbine engine between the electrical power output and the mechanical power output such that each of the electrical power output and the mechanical power output receive between 20%-80% of a total power output of the turbine engine, wherein the total power output of the turbine engine represents 100%.

19. The aircraft powerplant of clause 17, wherein while the turbine engine is operating at more than 70% capacity, the power transmission delivers at least 90% of the output power of the turbine engine to the electrical power output and less than 10% of the output power of the turbine engine to the propulsion mechanism.

20. The aircraft powerplant of clause 16, wherein the power transmission causes substantially all of the power output from the turbine engine to be output to the electric machine during a vertical flight mode of an aircraft.

21 The aircraft powerplant of clause 17, wherein the power transmission causes substantially all of the power output from the turbine engine to be output to the propulsion mechanism during a vertical flight mode of an aircraft.

22. A method for splitting power output from an engine of an aircraft between an electric power output and a mechanical power output, the method comprising:

controlling, in a first mode of operation, a power transmission of the aircraft to generate electrical power using substantially all power output from the engine; and controlling, in a second mode of operation, the power transmission to generate very little or no electricity from the mechanical power output from the engine, wherein the second mode further comprises controlling the power transmission such that most or all of the power output from the engine is directed to the mechanical power output.

23. The method of clause 18, wherein the power transmission comprises a gearset having:

a sun gear connected to an output shaft of the engine;

a plurality of planet gears connected to a planet carrier, wherein the planet carrier is connected to a propulsion mechanism; and a ring gear.

24. The method of clause 18, wherein the power transmission comprises an electric machine, and further wherein, in the first mode of operation, a first field current is applied to a stator of the electric machine and in the second mode of operation a second field current different from the first field current is applied to the stator.

25. An aircraft powerplant comprising:

an engine comprising an output power shaft configured to output power from the engine;

a bypass fan;

an electric machine; and a transmission comprising:

an input, a first output shaft, and a second output shaft, wherein:

the output power shaft from the engine is configured to drive the input of the transmission, the first output shaft is coupled to the bypass fan, the second output shaft is coupled to the electric machine, and the transmission is controllable to vary a percentage of the power from the engine between the first output shaft and the second output shaft such that a majority of the power is selectively provided to either the first output shaft or the second output shaft.

26. The aircraft powerplant of clause 25, wherein the electric machine comprises a plurality of electric machines, and further wherein the second output shaft comprises a plurality of second output shafts.

27. The aircraft powerplant of clause 25, wherein electric machine is a first electric machine, and the transmission comprises a planetary gearset comprising:

a sun gear coupled to the output power shaft;

a planet carrier coupled to a second electric machine or the bypass fan; and a ring gear coupled to the second electric machine or the bypass fan.

28. The aircraft powerplant of clause 25, wherein the transmission is controllable to selectively direct substantially all of the engine torque provided to the input either the first output shaft or the second output shaft.

29. An aircraft powerplant comprising:

an engine comprising a shaft configured to output power from the engine;

a bypass fan;

a first electric machine;

a second electric machine; and a gearset comprising:

a sun gear, a plurality of planet gears connected to a planet carrier, and a ring gear, wherein:

the shaft is configured to drive an input of the first electric machine, the shaft is further configured to drive the sun gear, the second electric machine is configured to drive the ring gear, and the bypass fan is connected to the planet carrier.

30. The aircraft powerplant of clause 29, wherein the first electric machine is configured to output electrical power generated based on spinning of the shaft.

31. The aircraft powerplant of clause 29, wherein the engine comprises a turbine engine, a piston engine, or a rotary engine.

32. The aircraft powerplant of clause 29, wherein while the first electric machine is driving the sun gear, the second electric machine is controllable to cause the ring gear to rotate at a rotations per minute (RPM) to cause the planet carrier not to rotate.

33. The aircraft powerplant of clause 32, wherein while the planet carrier is not rotating, the bypass fan also does not rotate.

34 The aircraft powerplant of clause 32, wherein while the planet carrier is not rotating, a spinning component of the first electric machine is driven by the shaft of the engine.

35. The aircraft powerplant of clause 32, wherein the RPM is a first RPM, and further wherein while the first electric machine is driving the sun gear, the second electric machine is controllable to cause the ring gear to rotate at a second RPM to cause the planet carrier to rotate.

36. The aircraft powerplant of clause 35, wherein while the planet carrier is rotating, the bypass fan also rotates to provide propulsion to an aircraft.

37. The aircraft powerplant of clause 35, wherein while the second electric machine is controllable to cause the ring gear to rotate at the second RPM, the second electric machine is generating electrical power.

38. The aircraft powerplant of clause 35, wherein the first electric machine is configured to generate electrical power based on the input of the first electric machine being driven by the shaft.

39. The aircraft powerplant of clause 38, wherein the first electric machine does not generate electrical power in response to a spinning component of the first electric machine being driven by the shaft while no field current is applied to a stator of the first electric machine and the spinning component spins.

40. The aircraft powerplant of clause 38, wherein input of the first electric machine is configured to be selectively disengaged from the shaft of the engine, such that the first electric machine does not generate electrical power while the input of the first electric machine is disengaged from the shaft of the engine.

41. The aircraft powerplant of clause 40, further comprising a synchromesh transmission configured to selectively disengage the input of the first electric machine from the shaft of the engine.

42. The aircraft powerplant of clause 40, further comprising a transmission or clutch having a first side connected to the input of the first electric machine a second side connected to the spinning component of the first electric machine, and further wherein the first electric machine is controllable to cause a first rotations per minute (RPM) of the second side of the transmission to match a second RPM of the first side of the transmission prior to engagement of the first side with the second side.

43. The aircraft powerplant of clause 35, wherein the first electric machine is configured to output electrical power to a bus.

44. The aircraft powerplant of clause 43, wherein the second electric machine is configured to be driven by power from the bus or is configured to act as a generator and provide power to the bus.

45. The aircraft powerplant of clause 44, wherein the bus is further connected to an energy storage device.

46 The aircraft powerplant of clause 45, further comprising gears to step down RPM between the shaft of the engine and the input of the first electric machine.

47. The aircraft powerplant of clause 45, further comprising a third electric machine, wherein the shaft is further configured to drive the third electric machine.

48. The aircraft powerplant of clause 47, wherein the shaft comprises a first gear, the input of the first electric machine comprises a second gear configured to rotate along with the first gear, and an input of the third electric machine comprises a third gear configured to rotate along with first gear.

49 The aircraft powerplant of clause 47, wherein each of the first electric machine, the second electric machine, and the third electric machine are each located at different positions around an axis of the shaft.

50. A method for splitting power output from an engine between a first electric machine and a bypass fan comprising:

controlling, in a first mode of operation, the first electric machine to generate electricity using most or all mechanical power output from the engine, wherein in the first mode further comprises controlling a gearset using a second electric machine such that little or none of the mechanical power output from the engine is directed to a bypass fan, wherein the gearset comprises:

a sun gear connected to an output shaft of the engine;

a plurality of planet gears connected to a planet carrier, wherein the planet carrier is connected to the bypass fan; and a ring gear connected to the second electric machine;

controlling, in a second mode of operation using the first electric machine and the second electric machine, to cause the first electric machine to generate electricity using a first substantial portion of the mechanical power output from the engine and to cause a second substantial portion of the mechanical power output from the engine to the bypass fan; and controlling, in a third mode of operation, the first electric machine to generate very little or no electricity from the mechanical power output from the engine, wherein in the third mode further comprises controlling the gearset using the second electric machine such that most or all of the mechanical power output from the engine is directed to the bypass fan.

51. The method of clause 50, wherein during the first mode of operation, an aircraft implementing the method is in a vertical flight mode.

52. The method of clause 50, wherein during the second mode of operation, an aircraft implementing the method is performing a transition between vertical and horizontal flight modes.

53. The method of clause 50, wherein during the second mode of operation, an aircraft implementing the method is in a horizontal flight mode and a high-power accessory is also in use.

54 The method of clause 50, wherein during the third mode of operation, an aircraft implementing the method is in a horizontal flight mode.

55. The method of clause 50, further comprising controlling a rotation per minute (RPM) of the first electric machine to match an RPM of a disengaged input to the first electric machine, wherein the disengaged input is driven by the output shaft of the engine.

56. The method of clause 55, further comprising, after matching the RPM of the first electric machine to the RPM of the disengaged input to the first electric machine, causing a spinning component of the first electric machine to be engaged with the input to the first electric machine.

57. The method of clause 56, wherein the spinning component of the first electric machine is engaged with the input to the first electric machine via a synchromesh transmission configured to connect the input to the first electric machine and the spinning component of the first electric machine.

58. A power transmission for an aircraft comprising:

a shaft input configured to receive rotational power from an engine of the aircraft;

a shaft output configured to output mechanical power to a propulsion mechanism of the aircraft;

an electrical output configured to output electrical power; and an electric machine configured to receive the rotational power via the shaft input and selectively generate electrical power output via the electrical output, the electrical power selectively generated by the electric machine being at least a majority of the rotational power received from the engine of the aircraft via the shaft input.

59. The power transmission of clause 58, a rotor of the electric machine is coupled to the shaft input.

60. The power transmission of clause 58, wherein the electric machine is configured to generate the electrical power output based on a field current applied to a stator of the electric machine.

61. The power transmission of clause 58, wherein the shaft input comprises a spline that corresponds to a gear attached to a rotor of the electric machine, such that the rotor of the electric machine rotates along with the spline of the shaft input.

62. The power transmission of clause 58, wherein the emachine comprises two or more emachines each having a rotor configured to rotate along with the shaft input.

63. The power transmission of clause 62, wherein each of the two or more emachines has a respective gear attached to its respective rotor and configured to rotate along with a spline of the shaft input.

64 The power transmission of clause 58, further comprising a planetary gearset connected to the shaft input and the propulsion mechanism, wherein the planetary gearset is configured to selectively output the mechanical power to the propulsion mechanism.

65. The power transmission of clause 64, wherein the electric machine is a first electric machine, and further comprising a second electric machine having an output connected to a component of the planetary gearset, wherein the second electric machine is configured to selectively control whether the planetary gearset outputs the mechanical power to the propulsion mechanism.

66. The power transmission of clause 65, wherein the first electric machine and the second electric machine are located on opposite sides of the input shaft.

67. The power transmission of clause 58, further comprising a synchromesh transmission configured to selectively engage a rotor of the electric machine.

68. The power transmission of clause 67, wherein the electric machine comprises an inrunner configuration such that the input shaft passes through the rotor and a stator of the electric machine.

69. The power transmission of clause 58, wherein the electric machine is located at any point along the shaft input driven by the engine.

70. The power transmission of clause 58, wherein a first axis through a center of a rotor of the electric machine is parallel to a second axis of the shaft input.

71. The power transmission of clause 58, wherein a first axis through a center of a rotor of the electric machine is not parallel to a second axis of the shaft input, and further wherein beveled gearing is used to connect a gear of the electric machine to the shaft input.

72. The power transmission of clause 58, wherein the electric machine is located forward of the engine of the aircraft and aft of shaft output, such that the electric machine is between the engine and the shaft output.

73. The power transmission of clause 58, wherein the electric machine is located forward of both of the engine of the aircraft and the shaft output.

74 The power transmission of clause 58, wherein the electric machine is located aft of both of the engine of the aircraft and the shaft output.

75. A power transmission for an aircraft comprising:

a shaft input configured to receive rotational power from a turbine engine of the aircraft;

a shaft output configured to output mechanical power to a propulsion mechanism of the aircraft;

an electrical output configured to output electrical power to an electric motor of the aircraft;

an electric machine; and a control system configured to selectively cause the electric machine to generate electrical power and output the electrical power out of the electrical output to the electric motor, the electrical power selectively generated by the electric machine being at least a majority of the rotational power received from the engine of the aircraft via the shaft input, wherein the control system is further configured to selectively cause the amount of electrical power generated by the electric machine to be less than a majority of the rotational power received from the engine while outputting the mechanical power to the propulsion mechanism of the aircraft.

76. The power transmission of clause 75, wherein the electric machine comprises at least three electric machines each configured to generate the electrical power.

77. The power transmission of clause 76, wherein the control system selectively controls a field current of each of the at least three electric machines such that only a subset of the at least three electric machines is generating the electrical power at a given time.

78. A method for splitting power output from an engine of an aircraft between an electric machine and a bypass fan comprising:

receiving, via an input shaft of a power transmission, rotational power from the engine;

selectively splitting, with gearing, clutching, and/or transmission components of the power transmission, power output from the power transmission between a mechanical power output connected to a propulsion mechanism and an electrical output of the power transmission, wherein an amount of power output at the electrical output is selectable to be a majority of the power input from the engine at the input shaft, and wherein the power output at the electrical output is generated by at least one electric machine of the power transmission.

79. The method of clause 78, wherein the amount of power output at the electrical output is the majority of the power input from the engine while the aircraft is in a vertical flight mode.

80. The method of clause 79, further wherein an amount of mechanical power output to the propulsion mechanism is a majority of the power input from the engine at the input shaft while the aircraft is in a horizontal flight mode.

81. A power transmission for an aircraft comprising:

input power shaft configured to receive power from an engine of the aircraft;

a propulsion mechanism;

an electric machine;

an output power shaft configured to output mechanical power to the propulsion mechanism;

an electrical output configured to output electrical power generated by the electric machine, wherein the power transmission is controllable to vary a percentage of the power from the engine between electrical power being output at the electric machine and mechanical power output at the output power shaft, and wherein the power transmission is controllable such that a majority of the power is selectively provided to either the output power shaft or the electric machine.

82. The power transmission of clause 81, wherein the electric machine is a first electric machine and the power transmission further comprises a second electric machine and a gearset configured to split power output between the output power shaft and the electric machine.

83. The power transmission of clause 82, wherein the gearset is a planetary gearset comprising a sun gear, a plurality of planet gears connected to a planet carrier, and a ring gear.

84. The power transmission of clause 83, the output power shaft is connected to the sun gear and the propulsion mechanism is connected to the planet carrier.

85. The power transmission of clause 84, wherein the second electric machine is controllable to cause the ring gear to rotate at a rotations per minute (RPM) that causes the planet carrier not to rotate and therefore the propulsion mechanism does not rotate.

86. The power transmission of clause 85, wherein while the planet carrier is not rotating, a spinning component of the first electric machine is driven by the input power shaft.

87. The power transmission of clause 85, wherein while the planet carrier is rotating, the propulsion mechanism rotates.

88. The power transmission of clause 84, wherein the second electric machine is controllable to cause the ring gear to rotate at a rotations per minute (RPM) that causes the planet carrier to rotate and therefore causes the propulsion mechanism to rotate.

89. The power transmission of clause 88, wherein the second electric machine is disengageable form the ring gear using a clutch or synchromesh gears.

90. The power transmission of clause 88, wherein while the propulsion mechanism rotates, less than a majority of power from the engine is output via the electrical output as electrical power.

91. The power transmission of clause 81, further comprising:

a gearset configured to split power output between the output power shaft and the electric machine; and a controllable electromechanical pin, lock, band clutch, brake, or other type of locking mechanism configured to lock a component of the gearset in place.

92. The power transmission of clause 91, wherein while the component of the gearset is locked, the gearset is configured to cause the propulsion mechanism to rotate and provide propulsion, and while the component of the gearset is not locked the component is configured to rotate causing the propulsion mechanism not to rotate.

93. The power transmission of clause 81, further comprising gearing to adjust rotations per minute (RPM) between any of the input power shaft, the output power shaft, the propulsion mechanism, and/or a spinning mechanism of the electric machine.

94. The power transmission of clause 93, wherein the RPM of the spinning mechanism is different from the RPM of the input power shaft.

95. The power transmission of clause 81, further comprising a synchromesh gear configured to engage or disengage the electric machine from the input power shaft.

96. The power transmission of clause 81, wherein a field current of the electric machine is configured to be selectively controlled such that the electric machine generates little or no power while a majority of power from the engine is output to the output power shaft.

97. A method for splitting power output from an engine between a first electric machine and a propulsion mechanism comprising:

controlling, in a first mode of operation, the first electric machine to generate electricity using most or all mechanical power output from the engine, wherein the first mode further comprises controlling a gearset using a second electric machine such that little or none of the mechanical power output from the engine is directed to the propulsion mechanism;

controlling, in a second mode of operation using the first electric machine and the second electric machine, the first electric machine to generate electricity using a first substantial portion of the mechanical power output from the engine and the gearset to cause a second substantial portion of the mechanical power output from the engine to be output to the propulsion mechanism; and controlling, in a third mode of operation, the first electric machine to generate very little or no electricity from the mechanical power output from the engine, wherein the third mode further comprises controlling the gearset using the second electric machine such that most or all of the mechanical power output from the engine is directed to the propulsion mechanism.

98. The method of clause 97, wherein the first electric machine is controlled based on a field current applied to the first electric machine, gearing between a shaft of the engine and a rotor of the first electric machine, or a clutch between the shaft of the engine and the rotor of the first electric machine.

99. A method for splitting power output from an engine between an electric machine and a propulsion mechanism comprising:

controlling, in a first mode of operation, the electric machine to generate electricity using most or all mechanical power output from the engine, wherein the first mode further comprises controlling a gearset and/ or clutches such that little or none of the mechanical power output from the engine is directed to the propulsion mechanism; and controlling, in a second mode of operation, the electric machine to generate very little or no electricity from the mechanical power output from the engine, wherein the second mode further comprises controlling the gearset and/or clutches such that most or all of the mechanical power output from the engine is directed to the propulsion mechanism.

100. The method of clause 99, wherein the gearset and/or clutches comprises at least a first synchromesh gear or a first clutch that is configured to engage or disengage a rotor of the electric machine and a power shaft connected to the engine, and wherein the gearset and/or clutches further comprises at least a second synchromesh gear or a second clutch that is configured to engage or disengage the propulsion mechanism and the power shaft connected to the engine.

It will be understood that this description describes various physical components as being connected to or coupled to one another. As used herein, the terms connected to or coupled to may mean a direct or indirect coupling or connection. For example, as described herein certain components may be directly coupled to or connected to one another when the connections between the two components have no intermediate components to which they are connected. In various embodiments and examples, such as various examples described herein, components may also be indirectly coupled or connected to one another, such as through a gearing, clutches, couplings, transmissions, etc. As such, where components are described generally as connected or coupled to one another, such a connection or coupling may be indirect or direct. Components may also be described herein as specifically being directly connected or coupled as well as being indirectly connected or coupled.

Figure 17:
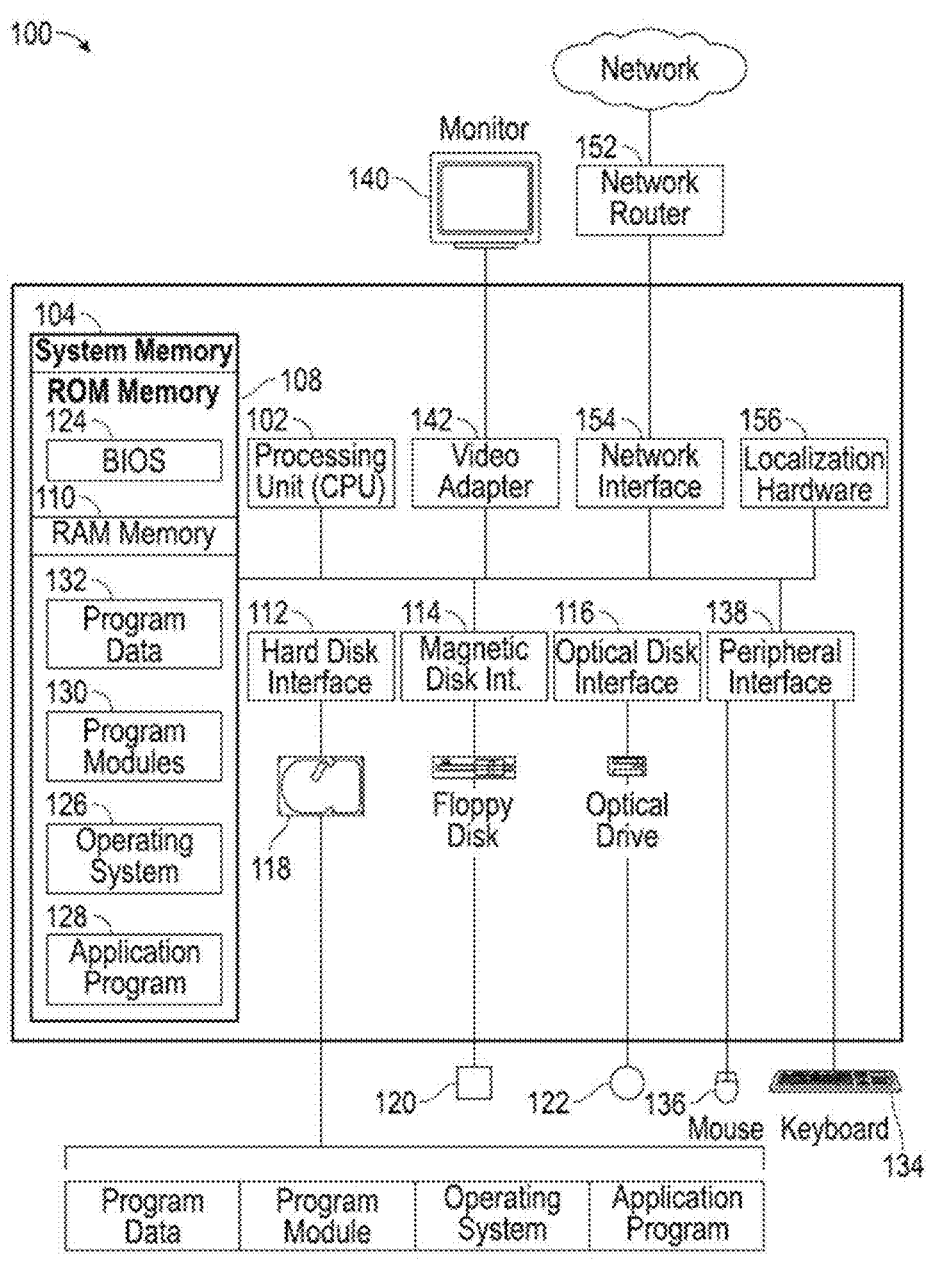
FIG. 17 is a diagrammatic view of an example of a computing environment, in accordance with various embodiments.

FIG. 17 is a diagrammatic view of an example of a computing environment that includes a general-purpose computing system environment 100, such as a desktop computer, laptop, smartphone, tablet, or any other such device having the ability to execute instructions, such as those stored within a non-transient, computer-readable medium. Various computing devices as disclosed herein (e.g., the processor(s)/controller(s) 905, the memory 910, or any other computing device in communication with those controllers that may be part of other components of an aircraft or control system of an aircraft—whether on board the aircraft or remote from the aircraft) may be similar to the computing system 100 or may include some components of the computing system 100. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 306, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 110, hard drive 118, and/or peripheral memory devices may be used to store computer executable instructions comprising an operating system 126, one or more applications programs 128 (which may include the functionality disclosed herein, for example), other program modules 130, and/or program data 122. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 132. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 186 for determining a location of the computing system environment 100. In some instances, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

In an illustrative embodiment, any of the operations described herein may be implemented at least in part as computer-readable instructions stored on a computer-readable medium or memory. Upon execution of the computer-readable instructions by a processor, the computer-readable instructions may cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or from practice of the disclosed embodiments. It is intended that the scope of the invention be defined by the claims appended hereto and their equivalents.

What is claimed is:

1. An aircraft powerplant comprising:
an engine having an output power shaft;
a power transmission coupled to the output power shaft of the engine, wherein;
   the power transmission is configured to divide power output of the engine between a mechanical power output and an electrical power output;
   a majority of the power output from the engine is adjustable to output to either of the mechanical power output or the electrical power output; and
   the power transmission comprises a planetary gearset and an electric machine, the electric machine configured to control a gear of the planetary gearset and thereby control division of the power output between the mechanical power output and the electrical power output;
a propulsion mechanism coupled to the mechanical power output; and
a control system configured to cause the power transmission to:
   deliver the majority of the power output of the engine to the propulsion mechanism to generate thrust or
   deliver the majority of the power output of the engine as electrical power output via the electrical power output.

2. The aircraft powerplant of claim 1, wherein the control system is configured to cause the power transmission to selectively divide the power output of the engine between the electrical power output and the mechanical power output such that each of the electrical power output and the mechanical power output receive between 20%-80% of a total power output of the engine, wherein the total power output of the engine represents 100%.

3. The aircraft powerplant of claim 1, wherein while the engine is operating at more than 70% capacity, the power transmission delivers at least 90% of the output power of the engine to the electrical power output and less than 10% of the output power of the engine to the propulsion mechanism.

4. The aircraft powerplant of claim 1, wherein the engine comprises a turbine engine, a piston engine, or a rotary engine.

5. The aircraft powerplant of claim 1, wherein the electrical power generated by the electric machine at the electrical power output is at least 250 kilowatts (KW) of maximum power, at least 370 kW of maximum power, at least 500 kW of maximum power, or at least 1 megawatt (MW) of maximum power.

6. The aircraft powerplant of claim 1, wherein the propulsion mechanism comprises a bypass fan or ducted bypass fan.

7. The aircraft powerplant of claim 1, wherein the propulsion mechanism comprises a propeller.

8. The aircraft powerplant of claim 1, wherein the power transmission comprises an additional electric machine configured to generate electrical power based on the power output from the engine allocated to the additional electric machine.

9. The aircraft powerplant of claim 8, wherein the electric machine is configured to provide electrical power to the electrical power output, wherein the electrical power is used to drive an electric motor configured to generate thrust for an aircraft.

10. The aircraft powerplant of claim 9, wherein the propulsion mechanism is configured to generate forward thrust for the aircraft, the propulsion mechanism is configured to generate the forward thrust for a horizontal flight mode of the aircraft, and the electric motor is configured to generate vertical thrust for a vertical flight mode of the aircraft.

11. The aircraft powerplant of claim 1, wherein the power transmission is configured to adjust a split of power output from the engine such that:
   at a first time, at least 95% of the power output from the engine is output to the mechanical power output while 5% or less of the power output from the engine is output to the electrical power output; and
   at a second time, at least 95% of the power output from the engine is output to the electrical power output while 5% or less of the power output from the engine is output to the mechanical power output.

12. The aircraft powerplant of claim 1, wherein the power transmission is configured to adjust a split of power output from the engine such that:
   at a first time, at least 98% of the power output from the engine is output to the mechanical power output while 2% or less of the power output from the engine is output to the electrical power output; and
   at a second time, at least 98% of the power output from the engine is output to the electrical power output while 2% or less of the power output from the engine is output to the mechanical power output.

13. The aircraft powerplant of claim 1, wherein the engine and the power transmission are mounted within a nacelle housing of an aircraft.

14. The aircraft powerplant of claim 1, wherein the electrical power output is configured to output power at a nominal voltage of 400V, 800V, 1000V 1200V, 1500V, 2.4 kV, or 3 kV.

15. The aircraft powerplant of claim 14, wherein the power transmission comprises an electric machine, and further wherein the electric machine is configured to output power at the nominal voltage by way of a voltage conversion device.

16. The aircraft powerplant of claim 1, wherein the planetary gearset further comprises:
   a sun gear coupled to the output power shaft;
   a planet carrier coupled to an electric machine or the mechanical power output; and
   a ring gear coupled to the electric machine or the mechanical power output,
   wherein an output of the electric machine is coupled to the electrical power output.

17. The aircraft powerplant of claim 16, wherein the gear of the planetary gearset configured to be controlled by the electric machine comprises the ring gear.

18. The aircraft powerplant of claim 17, wherein a state current is configured to be selectively applied to the electric machine to control the division of the power output between the mechanical power output and the electrical power output.

19. The aircraft powerplant of claim 17, further comprising a gear connected to a shaft of the electric machine, wherein the gear interacts with the ring gear such that the ring gear rotates with the gear connected to the shaft of the electric machine.

20. The aircraft powerplant of claim 1, wherein the engine comprises a turbine engine.

* * * * *